United States Patent
Doucette et al.

(10) Patent No.: US 9,582,272 B1
(45) Date of Patent: Feb. 28, 2017

(54) METHOD AND SYSTEM FOR REMOTE COMPUTING SESSION MANAGEMENT

(75) Inventors: Daniel Jean Donat Doucette, Port Moody (CA); Kurt Rien Fennig, Port Moody (CA); David Victor Hobbs, Surrey (CA)

(73) Assignee: Teradici Corporation, Burnaby, British Columbia (CA)

( * ) Notice: Subject to any disclaimer, the term of this patent is extended or adjusted under 35 U.S.C. 154(b) by 1234 days.

(21) Appl. No.: 13/523,407

(22) Filed: Jun. 14, 2012

Related U.S. Application Data

(63) Continuation of application No. 12/657,695, filed on Jan. 26, 2010, now Pat. No. 8,224,885.

(60) Provisional application No. 61/147,445, filed on Jan. 26, 2009.

(51) Int. Cl.
| | |
|---|---|
| *G06F 15/16* | (2006.01) |
| *G06F 9/00* | (2006.01) |
| *G06F 3/14* | (2006.01) |
| *G06F 9/455* | (2006.01) |
| *G06F 9/44* | (2006.01) |

(52) U.S. Cl.
CPC .............. *G06F 9/00* (2013.01); *G06F 3/1438* (2013.01); *G06F 9/4445* (2013.01); *G06F 2009/4557* (2013.01); *G06F 2209/509* (2013.01)

(58) Field of Classification Search
CPC ......... G06F 9/45558; G06F 2009/4557; G06F 3/1438; G06F 9/4445; G06F 2209/509
See application file for complete search history.

(56) References Cited

U.S. PATENT DOCUMENTS

| | | |
|---|---|---|
| 5,018,076 A | 5/1991 | Johary et al. |
| 5,448,702 A | 9/1995 | Garcia, Jr. et al. |
| 5,519,436 A | 5/1996 | Munson |
| 5,526,017 A | 6/1996 | Wilkie |
| 5,708,779 A | 1/1998 | Graziano et al. |
| 5,880,741 A | 3/1999 | Takeuchi |
| 5,951,706 A | 9/1999 | Benner |
| 6,012,101 A | 1/2000 | Heller et al. |
| 6,038,616 A | 3/2000 | Thornton et al. |
| 6,046,751 A | 4/2000 | Kato et al. |
| 6,119,146 A | 9/2000 | Heller et al. |
| 6,154,793 A | 11/2000 | MacKenna et al. |
| 6,252,979 B1 | 6/2001 | Lee et al. |
| 6,260,068 B1 | 7/2001 | Zalewski et al. |
| 6,292,853 B1 | 9/2001 | Takahashi |
| 6,333,750 B1 | 12/2001 | Odryna et al. |

(Continued)

OTHER PUBLICATIONS

Dowty, M. and Sugerman, J., "GPU Virtualization on VMware's Hosted I/O Architecture", SIGOPS Oper. Syst. Rev. 43, Jul. 3, 2009, 73-82. N.Y., USA.

(Continued)

*Primary Examiner* — John MacIlwinen
(74) *Attorney, Agent, or Firm* — Moser Taboada

(57) ABSTRACT

A method and apparatus for image encoding. In one embodiment, the method comprises encoding a first image portion by a first encoder associated with a first processor at a host system; dynamically determining a requirement to encode a second image portion by the first encoder or by a second encoder associated with a second processor at the host system; and encoding, based on the requirement, the second image portion by the first encoder or the second encoder.

20 Claims, 10 Drawing Sheets

(56) References Cited

U.S. PATENT DOCUMENTS

| | | | |
|---|---|---|---|
| 6,347,344 B1 | 2/2002 | Baker et al. | |
| 6,385,666 B1 | 5/2002 | Thornton et al. | |
| 6,483,515 B1 | 11/2002 | Hanko | |
| 6,532,511 B1 | 3/2003 | Brooks | |
| 6,570,890 B1 | 5/2003 | Keenan et al. | |
| 6,662,246 B2 | 12/2003 | Honary et al. | |
| 6,748,473 B1 | 6/2004 | Shatas et al. | |
| 6,806,885 B1 | 10/2004 | Piper et al. | |
| 6,963,946 B1 | 11/2005 | Dwork et al. | |
| 7,043,748 B2 | 5/2006 | Thornton et al. | |
| 7,095,386 B2 | 8/2006 | Alben et al. | |
| 7,133,362 B2 | 11/2006 | Chu et al. | |
| 7,133,940 B2 | 11/2006 | Blightman et al. | |
| 7,136,394 B2 | 11/2006 | Horowitz et al. | |
| 7,161,557 B2 | 1/2007 | Thornton | |
| 7,317,685 B1 | 1/2008 | Flott et al. | |
| 8,028,040 B1 * | 9/2011 | Hobbs | G06F 9/45558 370/389 |
| 8,341,624 B1 * | 12/2012 | Hobbs | H04N 19/152 709/204 |
| 8,572,251 B2 * | 10/2013 | Srinivas | G06F 9/5044 709/203 |
| 2001/0000539 A1 | 4/2001 | Heller et al. | |
| 2001/0011965 A1 | 8/2001 | Wilks | |
| 2002/0059639 A1 | 5/2002 | Thornton et al. | |
| 2002/0149617 A1 | 10/2002 | Becker | |
| 2002/0180725 A1 | 12/2002 | Simmonds et al. | |
| 2003/0093568 A1 * | 5/2003 | Deshpande | G06F 3/1462 709/247 |
| 2003/0098820 A1 | 5/2003 | Someya et al. | |
| 2003/0158906 A1 | 8/2003 | Hayes | |
| 2003/0193486 A1 | 10/2003 | Estrop | |
| 2003/0208340 A1 | 11/2003 | Dorough | |
| 2003/0212811 A1 | 11/2003 | Thornton | |
| 2004/0001622 A1 | 1/2004 | Roylance et al. | |
| 2004/0015597 A1 | 1/2004 | Thornton | |
| 2004/0212730 A1 | 10/2004 | MacInnis et al. | |
| 2004/0222941 A1 | 11/2004 | Wong et al. | |
| 2005/0060421 A1 | 3/2005 | Musunuri et al. | |
| 2005/0204015 A1 | 9/2005 | Steinhart et al. | |
| 2005/0257239 A1 | 11/2005 | Evans et al. | |
| 2006/0005189 A1 | 1/2006 | Vega et al. | |
| 2006/0069797 A1 * | 3/2006 | Abdo | H04L 65/4084 709/231 |
| 2006/0282855 A1 | 12/2006 | Margulis | |
| 2007/0097130 A1 | 5/2007 | Margulis | |
| 2007/0124474 A1 | 5/2007 | Margulis | |
| 2007/0180436 A1 | 8/2007 | Travostino et al. | |
| 2007/0180448 A1 | 8/2007 | Low et al. | |
| 2007/0204265 A1 | 8/2007 | Oshins | |
| 2007/0220121 A1 | 9/2007 | Suwarna | |
| 2007/0260768 A1 | 11/2007 | Bender et al. | |
| 2009/0007106 A1 | 1/2009 | Araujo, Jr. et al. | |
| 2009/0293055 A1 | 11/2009 | Carroll et al. | |
| 2010/0131669 A1 | 5/2010 | Srinivas et al. | |
| 2010/0131944 A1 | 5/2010 | Iorio et al. | |

OTHER PUBLICATIONS

Kadav, A. and Swift, M. , "Live Migration of Direct Access Devices", ACM SIGOPS Operating Systems Review vol. 43 , Issue 3, pp. 95-104, Jul. 2009 N.Y. USA.

"Portable Multimedia", Whitepaper, CEVA Corporation, 2005.

Huang, W., Liu, J., Koop, M., Abali, B., and Panda, D., "Nomad: Migrating OS-bypass Networks in Virtual Machines", In Proceedings of the 3rd International Conference on Virtual Execution Environments (San Diego, California, USA, Jun. 13-15, 2007). VEE '07. ACM, New York, NY, 158-168 USA.

Sugerman, J., Venkitachalam, G., and Lim, B., "Virtualizing I/O Devices on VMware Workstation's Hosted Virtual Machine Monitor", In Proceedings of the General Track: 2002 USENIX Annual Technical Conference (Jun. 25-30, 2001). Y. Park, Ed. USENIX Association, Berkeley, CA, 1-14.

Lagar-Cavilla, H. A., Tolia, N., de Lara, E., Satyanarayanan, M., and O'Hallaron, D., "Interactive Resource-Intensive Applications Made Easy", In Proceedings of the ACM/IFIP/USENIX 2007 International Conference on Middleware (Newport Beach, California, Nov. 26-30, 2007). Springer-Verlag New York, New York, NY, 143-163 USA.

Niranjan, R.; Gavrilovska, A.; Schwan, K.; Tembey, P., "Towards IQ-Appliances: Quality-awareness in Information Virtualization", Network Computing and Applications, 2007. NCA 2007., Jul. 12-14, 2007 pp. 291-294.

Kapasi U., Daily W.J., Rixner S., Owens J.D., and Khailany B., "The Imagine Stream Processor", Proceedings of International Conference on Computer Design, Sep. 16-18, 2002, Freiburg, Germany.

"Solution Paper: Statistical Multiplexing over IP", Motorola, Inc. 2008.

Tarigopula, S., "A CAM-Based, High-Performance Classifier-Scheduler for a Video Network Processor", Thesis prepared for the Degree of Master of Science, University of North Texas, Texas, USA, May 2008.

"X550 Datasheet", Ncompting Corporation, 2008.

"Zero Client Technology: History, Use and Critical Comparison", Applica Inc. Web Article (http://www.applica.com/zeroCtech.shtml) 4 pages. Copyright 1997-2005.

Dale Beermann, Greg Humphreys, "Visual Computing in the Future: Computer Graphics as a Remote Service", University of Virginia, Computer Science Department, University of Virginia Technical Report CS-2003-16, 25 Pages, Jun. 1, 2003.

William Blanke, Chandrajit Bajaj, Donald Fussell, and Xiaoyu Zhang, "The Metabuffer: A Scalable Multiresolution Multidisplay 3-D Graphics System Using Commodity Rendering Engines", TR200-16, The University of Texas at Austin, 7 Pages, Feb. 2000.

Han Chen, Yuqun Chen, Adam Finkelstein, Thomas Funkhouser, Kai Li, Zhiyan Liu, Rudrajit Samanta, and Grant Wallace, "Data Distribution Strategies for High-Resolution Displays", Computers & Graphics. vol. 25 No. 5 :811-818, 5 Pages, Oct. 2001.

A. Heirich and L. Moll, "Scalable Distributed Visualization Using Off-The-Shelf Components", IEEE Parallel Visualization and Graphics Symposium—1999, San Francisco, California, pp. 55-59, Oct. 1999.

Greg Humphreys, Matthew Eldridge, Ian Buck, Gordon Stoll, Matthew Everett, and Pat Hanrahan, "WireGL: A Scalable Graphics System for Clusters", Computer Graphics (SIGGRAPH 2001), 12 Pages, 2001.

Tristan Richardson, Quentin Stafford-Fraser,Kenneth R. Wood and Andy Hopper, "Virtual Network Computing", Reprint from IEEE Internet Computing vol. 2, No. 1, 7 Pages, Jan./Feb. 1998.

"OpenGL Vizserver™ 3.1 Application-Transparent Remote Interactive Visualization and Collaboration", Silicon Graphics Inc. 15 pages, 2003.

Rajvikram Singh, Byungil Jeong, Luc Renambot, Andrew Johnson, Jason Leigh "TeraVision: a Distributed, Scalable, High Resolution Graphics Streaming System", Proceedings of Cluster 2004, San Diego, CA, 10 pages, Sep. 2004.

Applica Presenter Product Datasheet, SmartAVI, Inc, 3111 Winona Ave, Suite 101 Burbank, CA 91504, 4 Pages, obtained 2010.

Roger Zimmermann and Dwipal A. Desai, "Ethernet Interface for Head-Mounted Displays", USC Technical Report USC-CS-TR05-846, Integrated Media Systems Center, University of Southern California, 12 pages, Mar. 2005.

AppSense Performance Manager Datasheet v 1.1, 2005, Dynamically Manage System Performance, Availability and Capacity, pp. 1-2, obtained 2010.

"VMware Workload Management with AppSense Performance Manager", Whitepaper, AppSense Ltd, 3200 Daresbury Park, Daresbury, Warrington, WA4 4BU, United Kingdom, obtained 2010, pp. 1-12.

Brian Paul, Sean Ahern, E. Wes Bethel, Eric Brugger, Rich Cook, Jamison Daniel, Ken Lewis, Jens Owen, Dale Southard, "Chromium Renderserver: Scalable and Open Remote Rendering Infrastructure," IEEE Transactions on Visualization and Computer Graphics, vol. 14, No. 3, pp. 627-639, May/Jun. 2008.

(56) References Cited

OTHER PUBLICATIONS

Lagar-Cavilla, H. A., Tolia, N., Satyanarayanan, M., and de Lara, E. 2007, "VMM-Independent Graphics Acceleration", In Proceedings of the 3rd International Conference on Virtual Execution Environments (San Diego, California, USA, Jun. 13-15, 2007). VEE '07. ACM, New York, NY, 33-43.

Jonathan Chien-Liang Liu, David H.C. Du, Simon S.Y. Shim, Jenwei Hsieh, MengJou Lin, "Design and Evaluation of a Generic Software Architecture for On-Demand Video Servers," IEEE Transactions on Knowledge and Data Engineering, vol. 11, No. 3, pp. 406-424, May/Jun. 1999.

Abts, D., Bataineh, A., Scott, S., Faanes, G., Schwarzmeier, J., Lundberg, E., Johnson, T., Bye, M., and Schwoerer, G., "The Cray BlackWidow: A Highly Scalable Vector Multiprocessor", In Proceedings of the 2007 ACM/IEEE Conference on Supercomputing (Reno, Nevada, Nov. 10-16, 2007). SC '07. ACM, New York, NY, pp. 1-12.

"Advances in Memory Management for Windows", Microsoft Corporation, Oct. 12, 2007, pp. 1-26.

Office Action mailed Aug. 5, 2009 for U.S. Appl. No. 11/278,128 entitled "Methods and Apparatus for Enabling Multiple Remote Displays", David V. Hobbs, filed Mar. 30, 2006, pp. 1-32.

U.S. Appl. No. 11/904,879 entitled "Method and Apparatus for Scheduling a Resource of a Virtual Machine", David Victor Hobbs, filed Sep. 28, 2007, pp. 1-41.

Co-pending U.S. Appl. No. 12/460,384 entitled "Method and System for Image Sequence Transfer Scheduling", David Victor Hobbs, filed Jul. 17, 2009, pp. 1-62.

Co-pending U.S. Appl. No. 12/657,618 entitled "System and Method for Managing Multiple User Interface Sessions", Charles Peter Baron, et al., filed Jan. 22, 2010, pp. 1-72.

Co-pending U.S. Appl. No. 12/586,498 entitled "System and Method for Transferring Updates from Virtual Frame Buffers", Charles Peter Baron, filed Sep. 23, 2009, pp. 1-41.

"Microsoft RemoteFX for Virtual Desktop Infrastructure: Architectural Overview", Microsoft Corporation, USA, Jan. 2011, pp. 1-18.

"The Big IP System with Intelligent Compression", F5 Networks Whitepaper, Aug. 2005, USA, pp. 1-7.

Notice of Allowance mailed Feb. 16, 2012 for U.S. Appl. No. 12/657,695, entitled "Method and System for Remote Computing Session Management", Daniel Jean Donat Doucette, filed Jan. 26, 2010; pp. 1-24.

"Transforming the Business Desktop—PC-over-IP™ Technology Reinvents Computing", Teradici Corporation, 2007, pp. 1-6.

\* cited by examiner

FIG. 3
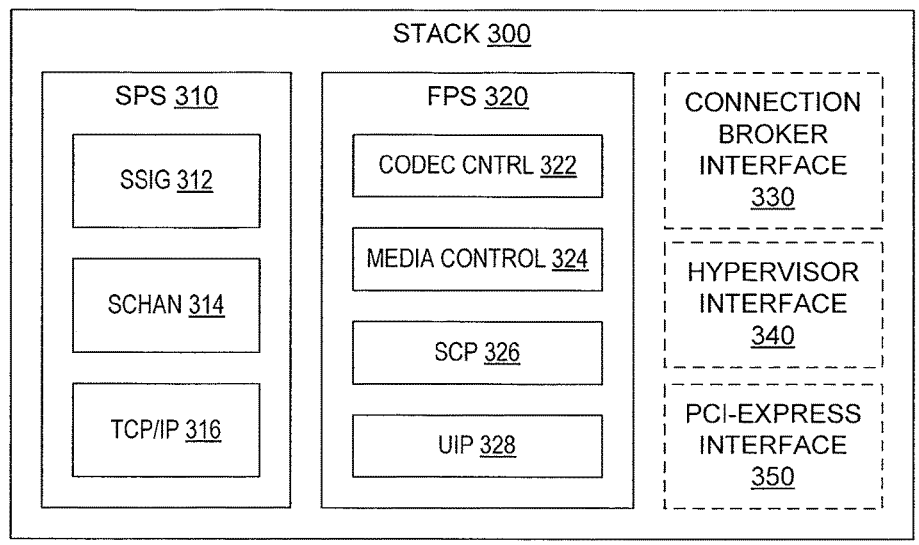
FIG. 4
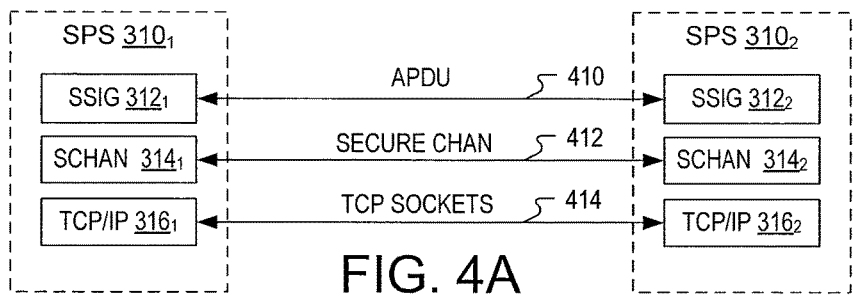
FIG. 4A
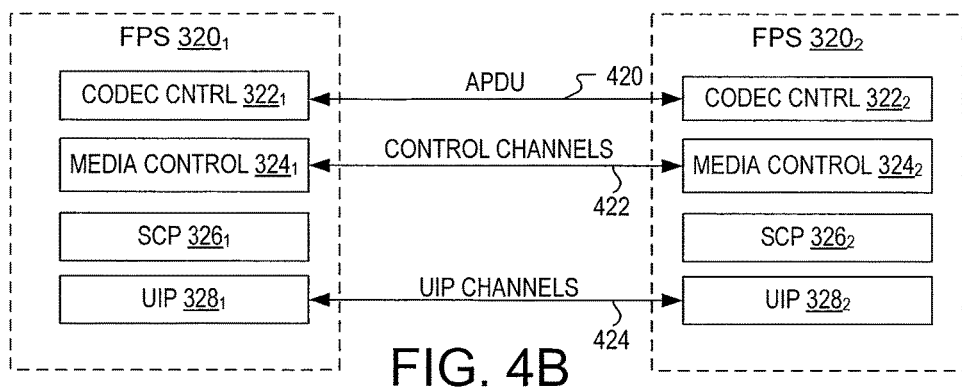
FIG. 4B

METHOD AND SYSTEM FOR REMOTE COMPUTING SESSION MANAGEMENT

CROSS-REFERENCE TO RELATED APPLICATIONS

This application is a continuation of co-pending U.S. patent application Ser. No. 12/657,695, filed Jan. 26, 2010, which claims benefit of U.S. provisional patent application Ser. No. 61/147,445, filed Jan. 26, 2009. Each of the aforementioned related patent applications is herein incorporated in its entirety by reference.

This application references co-pending, commonly assigned U.S. patent application Ser. No. 12/657,618, filed Jan. 22, 2010, entitled "System and Method for Managing Multiple User Interface Sessions", by Charles Peter Baron, David Victor Hobbs, Christopher Lawrence Topp, and Edlic Yiu, which is herein incorporated in its entirety by reference.

This application references co-pending, commonly assigned U.S. patent application Ser. No. 12/586,498, filed Sep. 23, 2009, entitled "System and Method for Transferring Updates from Virtual Frame Buffer", which is herein incorporated in its entirety by reference.

This application references co-pending, commonly assigned U.S. patent application Ser. No. 12/460,384, filed Jul. 17, 2009, entitled "Method and System for Image Sequence Transfer Scheduling", which is herein incorporated in its entirety by reference.

BACKGROUND OF THE INVENTION

Field of the Invention

Embodiments of the present invention generally relate to remote computing, and, more specifically, to user interface session management in a multi-session computing environment.

Description of the Related Art

Virtual Desktop Infrastructure (VDI) generally comprises a shared computing model in which a high performance computer, such as a server, runs multiple concurrent virtual machines (VM), each VM comprising an operating system and application software typical of a standard desktop computer. Remote computers, such as thin clients, zero clients, or mobile devices, each establish a connection with a particular VM, typically designated by a connection broker in communication with both the server and remote computing devices.

The user experience associated with a remote computing session between a VM and a remote computer becomes subject to performance degradation (i.e., increased latency, poor video quality, and/or dysfunctional peripheral devices) in various situations where the server becomes overloaded or the VM is migrated to a different server for administrative reasons, such as scheduled maintenance or load balancing measures.

Therefore, there is a need in the art for a system and method for managing remote computing sessions in such a manner as to overcome such degradation in the user experience.

SUMMARY OF THE INVENTION

Embodiments of the present invention generally relate to a method and apparatus for image encoding. In one embodiment, the method comprises encoding a first image portion by a first encoder associated with a first processor at a host system; dynamically determining a requirement to encode a second image portion by the first encoder or by a second encoder associated with a second processor at the host system; and encoding, based on the requirement, the second image portion by the first encoder or the second encoder.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 is a block diagram illustrating a protocol stack in accordance with one or more embodiments of the present invention;

FIGS. 4A and 4B illustrate the peer-to-peer relationship between corresponding layers of a slow path stack (SPS) and a fast path stack (FPS) in accordance with one or more embodiments of the present invention;

DETAILED DESCRIPTION

The present invention discloses a system and method for managing a remote computing session between a remote computer and a VM during migration of processing functions (e.g., codec functions) between the VM and a User Interface (UI) session processor.

A remote computer establishes a remote computing session with a VM operating on a particular host computer. If the VM has access to processing functions, such as image, Universal Serial Bus (USB), and/or audio coding functions advertised by a local UI session processor, the remote computing session is configured to include select advertised processing functions of the UI session processor rather than engaging similar functions provided by software in the VM itself. In some embodiments, such processing functions are migrated between the VM and the UI session processor within the context of an uninterrupted remote computing session to meet the dynamic processing distribution demands of the system.

Figure 1:
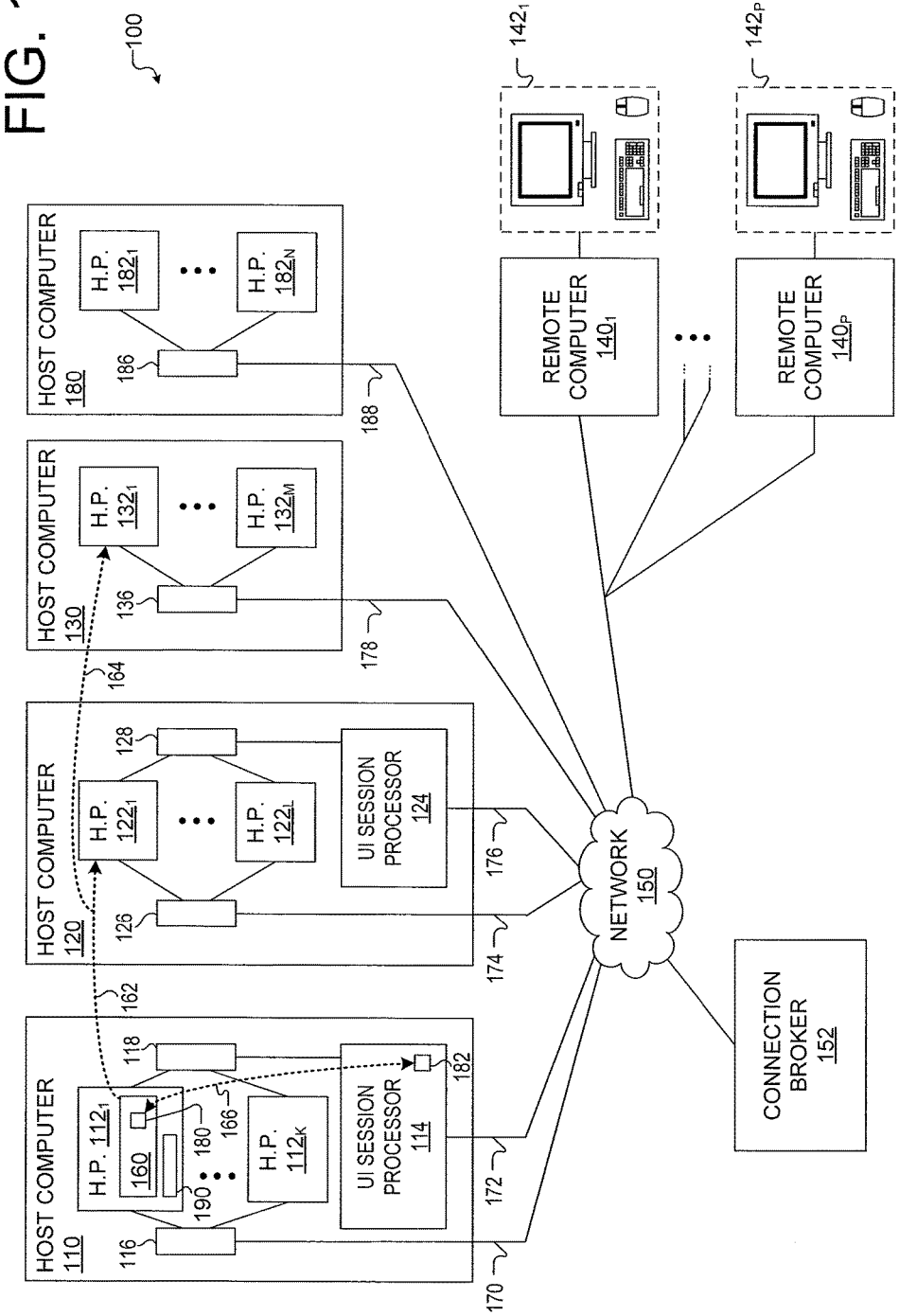
FIG. 1 is a block diagram of system comprising a remote computing environment in accordance with one or more embodiments of the present invention.

FIG. 1 is a block diagram of system 100 comprising a remote computing environment in accordance with one or more embodiments of the present invention. The system 100 comprises a first host computer 110 which, in itself, may comprise several host processors 112 (depicted as host processor $112_1 \ldots 112_K$), and at least one UI session processor 114 coupled to network 150 by Internet Protocol (IP) connection 172. In various embodiments, each host processor 112 comprises at least one Central Processing Unit (CPU), optionally one or more Graphic Processing Units (GPUs), or a combination of CPU and GPU processing elements, as well as additional elements for coupling host memory, CPU resources, and bus infrastructure, such as north bridge, south bridge, bus controller, and memory controller elements. In some embodiments, host processor 112 comprises one or more multi-core CPUs or separate CPUs interconnected by a HYPERTRANSPORT fabric, INTEL QUICKPATH interconnect, or the like, with host memory distributed between CPUs accordingly. Examples of well known suitable CPUs include server class processors (such as 32-bit, 64-bit, or other CPUs, including OPTERON or ATHLON class microprocessors manufactured by AMD Corporation), XEON or PENTIUM class processors manufactured by INTEL, or SPARC microprocessors manufactured by SUN MICROSYSTEMS Inc. However, any other microprocessor platform designed to host the remote computing methods described herein may be utilized.

In an embodiment, the host processors 112 host a virtualized desktop infrastructure (VDI) generally comprising a plurality of VMs (including VM 160 and other VMs not shown in FIG. 1) stored in host memory. Each VM generally comprises an operating system, driver software, and application software associated with a remote computing session. Within each VM, software applications with display presentation requirements (e.g., graphics drivers executing in conjunction with computer-aided design (CAD) software, spreadsheets, word processing software, and the like) generate display images in frame buffers typically located in the VM domain. Each initial display image is compressed by either software encoding resources in the VM or UI session processor 114, followed by communication of the compressed display image to a remote computer. Thereafter, changes to each display image are tracked, typically using frame buffer monitoring structures (i.e. one or more dirty mask bitmaps) and image updates associated with the display image changes are compressed by one of software encoding resources or UI session processor 114 and communicated. The host processors 112 are coupled to the UI session processor 114 by a peripheral interconnect, such as a PCI-EXPRESS interconnect supported by bus switch 118 comprising at least one of a server root complex manufactured by semiconductor vendors such as INTEL or AMD Corporations, or a PCI-EXPRESS switch manufactured by vendors such as PLX TECHNOLOGIES or INTEGRATED DEVICE TECHNOLOGIES (IDT). Additional details related to methods for handling the communication of user interface data, such as USB, audio, and image data, between a host processor 112 and a UI session processor 114 are disclosed in commonly assigned, co-pending U.S. patent application. Ser. No. 12/657,618, filed Jan. 22, 2010, entitled "System and Method for Managing Multiple User Interface Sessions", by Charles Peter Baron, David Victor Hobbs, Christopher Lawrence Topp, and Edlic Yiu.

The host processors 112 are also coupled to network 150 by IP connection 170 supported by network switch 116. In an embodiment, host computer 110 is a blade or rack-mount server system with host processors 112 comprising pluggable blades or modules supported by network switch 116. In such an implementation, network switch 116 may comprise hardware-based switching apparatus from companies such as BROADCOM, MARVEL, or CISCO corporations, and/or virtualized software-based switching components, such as a NEXUS vSwitch from CISCO corporation. In a blade server system, network switch 116, bus switch 118, and UI session processor 114 are pluggable, backplane-assembled, or independently-mounted apparatus in different embodiments. However, it is to be understood that host computer 110 may take forms other than a blade server, such as a plurality of independent computers coupled by cables or a plurality of processing cores and connection logic co-located on one or more silicon die structures.

System 100 comprises a second host computer 120 with host processors 122 (depicted as host processor $122_1 \ldots 122_L$) and UI session processor 124, and having IP connections 174 and 176, aided by network switch 126 and bus switch 128, respectively, to network 150. Additionally, system 100 comprises host computers 130 and 180. Host computer 130 comprises host processors 132 (depicted as host processor $132_1 \ldots 132_M$), and has an IP connection 178, aided by network switch 136 to the network 150. Host computer 180 comprises host processors 182 (depicted as host processor $182_1 \ldots 182_N$), and has an IP connection 188, aided by network switch 186, to the network 150. Host computers 130 and 180 lack the UI session processors of host computers 110 and 120, as may be the case for generic off-the-shelf-server products. However, host computers 130 and 180 are nevertheless each enabled to host software services essential for providing remote computing sessions. In some embodiments, system 100 may comprise fewer or more host computers of the same type as host computers 110 and 120 (i.e., host computers comprising several host processors and at least one UI session processor), fewer or more host computers of the same type as host computers 130 and 180 (i.e., host computers comprising several host processors and lacking a UI session processor), or any combination of the foregoing. In some other alternative embodiments, the host computers 110, 120, 130, and 180 are servers (i.e., system 100 comprises a first set of servers comprising UI session processor resources and a second set of servers without such UI session processor resources).

The network 150 comprises a communication system (e.g., the Internet, LAN, Wide Area Network (WAN), and the like) that connects computer systems completely by wire, cable, fiber optic, and/or wireless links facilitated by various types of well-known network elements, such as connection broker 152, Network Address Translation (NAT) gateways, hubs, switches, routers, firewalls, and the like. The network 150 may employ various well-known protocols, such as security protocols, to communicate information amongst the network resources. For example, in an embodiment, network 150 is a corporate network including part of the Internet.

The remote computers 140 (depicted as remote computers $140_1 \ldots 140_P$), are, generally, computing devices enabled to provide remote computing functions, such as presenting a computer desktop image (i.e., image data) for display (i.e., a display image), providing ports for connecting peripheral devices, and a providing network interfaces for connection to network 150. For example, in an embodiment, remote computer 140 is a terminal in a networked remote computer system 100. Examples of such remote terminals include zero client computers, thin client computers, personal computers, notebook computers, workstations, Personal Digital Assistants (PDAs), wireless devices, and the like.

Remote computer 140 comprises various session management and processing resources for encoding or decoding media, including image data and peripheral device data, associated with a remote computing session. In an embodiment, remote computer 140 comprises at least one of an image decoder for decoding compressed display image data received from the host computer, an audio decoder for decompressing output audio data, and an audio encoder for compressing input audio data. Additionally, in such an embodiment, remote computer 140 may comprise a USB codec for managing the translation of USB data between format requirements of one or more underlying USB bus controllers and format requirements suitable for standard network communication, such as USB Request Block (URB) format used in USB-over-IP protocols known to the art. These codec functions and communication protocols are complementary to related codec functions and communication protocols executed by host processor and UI session processor elements of host computers 110 and 120 and/or related software services provided by host computers 130 and 180.

The remote computer 140 is coupled to User Interface (UI) sub-system 142, (depicted as UI sub-systems $142_1 \ldots 142_P$), typically including UI devices, such as display, mouse, keyboard, audio devices, and/or other devices such as biometric peripherals, webcam, printers, and the like. Such devices are generally coupled to remote computer 140 by industry compliant connections, such as USB, Display-Port, Digital Visual Interface (DVI), and the like. The remote computer 140 comprises software stack components and session management functions, described herein, used for the establishment of a remote computing session with an available host computer (i.e., host computer 110, 120, 130, or 180).

One of the remote computers 140 establishes a connection with a virtual machine 160 (executed by a host processor 112) under direction of a connection broker 152 on network 150. The remote computing session between VM 160 and the remote computer 140 is aided by various codec functions resident within VM 160 and/or within UI session processor 114. In an embodiment, a particular codec function (e.g., an image compression function) is migrated (ref. migration path 166) between a codec function 180 of VM 160 and a similar codec function 182 of UI session processor 114 to meet the processing demands of the remote computing session.

In another embodiment, the termination endpoint at UI session processor 114 (and related network connection 172 to network 150) of a remote computing session between VM 160 and remote computer 140 is migrated from UI session processor 114 to VM 160 (and related network connection 170) without service interruption. Such a migration may be performed in preparation for a live migration of VM 160 (and the remote computing session) to host computer 120 (ref. VM migration path 162) or a live migration of VM 160 to host computer 130 (ref. VM migration path 164) or host computer 180 using VM migration methods known to the art. Of course, the VM 160 may also be migrated to a different host processor 112 of host computer 110, either by retaining the network session endpoint at UI session processor 114 and utilizing a different connection on switch 118, or by first moving the network session endpoint from UI session processor 114 to VM 160 followed by using a different connection on network switch 116 directed to the different host processor 112 hosting the relocated VM.

Generally, system 100 comprises multiple remote computers, each enabled to establish a remote computing session with an available VM and each host processor typically configured to execute many separate VMs. Typically, a host processor, such as host processor 112, is configured with hypervisor software 190 (also referred to as "hypervisor 190" or "hypervisor domain 190") that runs directly on the host processor 112 and manages the execution of the separate VMs (i.e., VM 160 as well as any additional VMs). Examples of such hypervisor software 190 include ESX from VMWARE Corporation, XEN from CITRIX corporation, or HYPER-V from MICROSOFT corporation. In some embodiments, the hypervisor software 190 comprises a "type II" hypervisor, such as a LINUX operating system available from various vendors (e.g., 'GSX Server' from VMWARE, 'Virtual PC' from MICROSOFT, or 'VIRTUALBOX' from SUN MICROSYSTEMS), which incorporates various software applications that manage the execution of the separate VMs. In other embodiments, host processor 112 comprises one or more remote computing applications, such one or more terminal server applications. Such remote computing applications execute either inside VM 160 under management of hypervisor 190 or directly in an operating system environment of host processor 112 in the absence of hypervisor 190 or independent of hypervisor 190.

Figure 2:
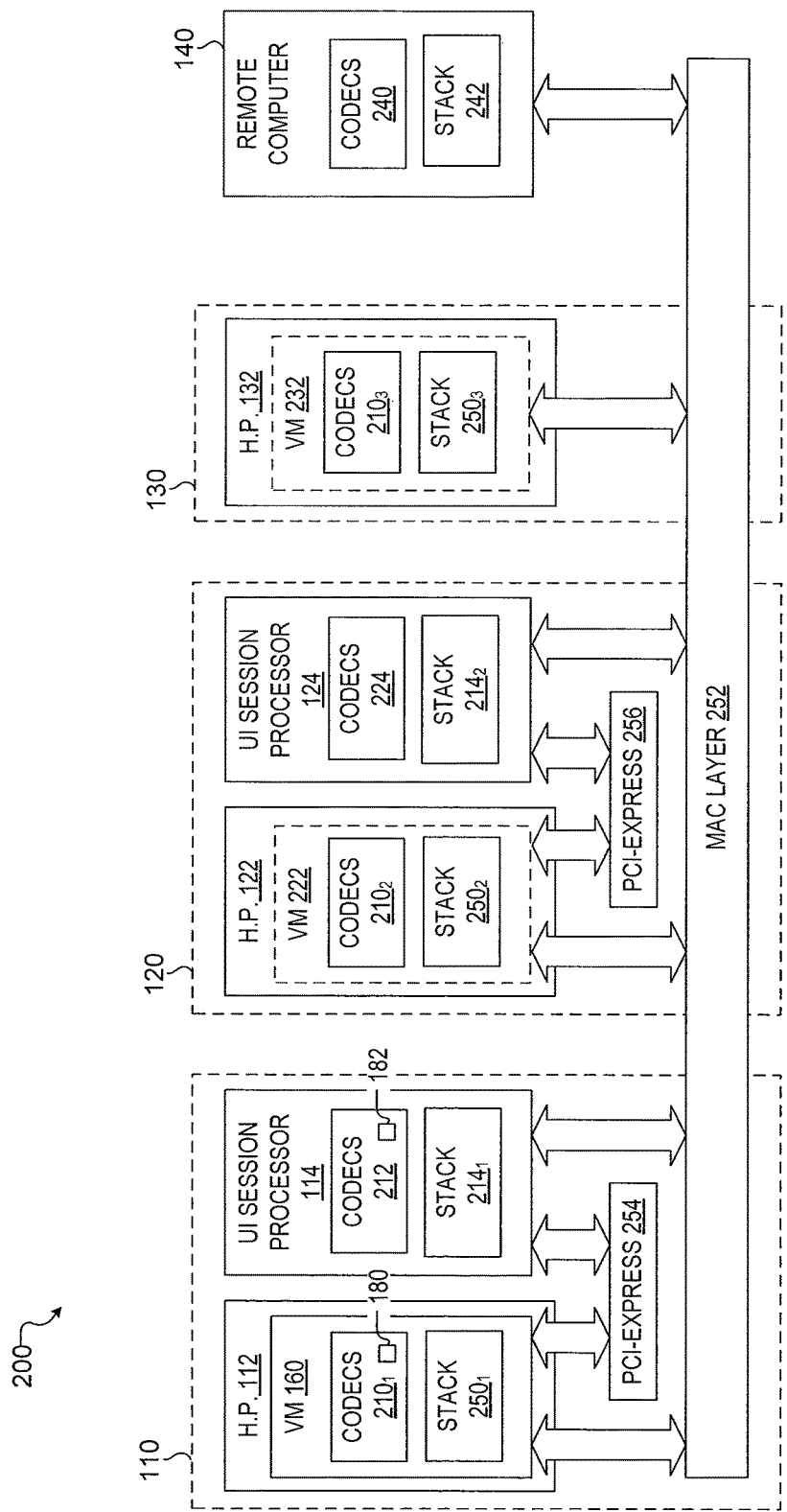
FIG. 2 a block diagram a illustrating a protocol structure in accordance with one or more embodiments of the present invention.

FIG. 2 is a block diagram a illustrating a protocol structure 200 in accordance with one or more embodiments of the present invention. The protocol structure 200 enables the remote computer 140 of to engage in a remote computing session with host computer 110 (comprising VM and UI session processor components) or a remote computing session that has been migrated to computer 120 or to computer 130. VM 160 is coupled to remote computer 140 by underlying data link structure Media Access Controller (MAC) layer 252, supported by protocol stack $250_1$ in the VM 160 and complementary stack 242 in the remote computer 140. The host processor 112 of VM 160 is coupled to UI session processor 114 by PCI-EXPRESS interconnect 254, supported by bus switch 118, physical layer structures, data-link protocol, and transaction layer protocol not shown in FIG. 2. Analogously, host computer 120 comprises PCI-EXPRESS interconnect 256 coupling one or more host processors 122 to UI session processor 124.

VM 160 comprises a suite of codecs $210_1$, including codec 180. The codecs $210_1$ comprise machine executable instructions directed at one or more media processing functions for encoding or decoding media associated with a remote computing session. Such media processing functions include audio compression for egress audio channels, audio decompression for ingress audio channels, other audio or voice processing functions, USB data coding or decoding functions, video decoder functions (e.g., enabled to decode an ingress video stream from a webcam), file compression functions, or image encoding functions. The suite of codecs $210_1$ of VM 160 are supported by codecs 240 in the remote computer 140. The codecs 240 provide complementary media processing functions, such as audio decompression for egress audio channels, audio compression for ingress audio channels, other audio or voice processing functions, USB data coding or decoding functions, video encoder functions (e.g., enabled to encode an ingress video stream from a webcam), file decompression functions, or image decoding functions.

Stack $250_1$ provides a network session termination point for various communications between remote computer 140 and VM 160, including media plane communications (e.g., peripheral device data and compressed image data) and control plane communications, such as session establishment, exchange of security information, tear down communications, and the like. In some embodiments, one or more lower layers of stack $250_1$, such as IP addressing functions, are implemented outside the domain of VM 160, e.g., in the hypervisor 190 or network switch 116.

UI Session processor 114 comprises codecs 212 (including codec 182) and protocol stack $214_1$ which provides protocol functions generally equivalent to those of stack $250_1$ when processor 114 serves as the network session endpoint with remote computer 140.

VM 160 is instantiated as VM 222 with codecs $210_2$ and stack $250_2$ following a live migration of the VM 160 from host computer 110 to host computer 120. It will be apparent to those of skill in the art of software engineering that codecs $210_2$ and stack $250_2$ are essentially replicas of codecs $210_1$ and stack $250_1$. UI Session processor 124 comprises codecs 224 (which may offer a different set of coded functions than those of codecs 212) and protocol stack $214_2$. Protocol stack $214_2$ provides protocol functions generally equivalent to those of stack $250_2$ under circumstances in which UI session processor 124 serves as the network session endpoint. Similarly, VM 160 is instantiated as VM 232 with codecs $210_3$ and stack $250_3$ after a migration from computer 110 to computer 130.

FIG. 3 is a block diagram illustrating a protocol stack 300 in accordance with one or more embodiments of the present invention. Protocol stack 300 is a communication stack, suited to both host computer and remote computer implementations, for managing control and media aspects of a remote computing session (i.e., stack 300 may be implemented as stack 250, 214 or 242). It is to be understood that host computer and remote computer implementations (i.e., stack 250, 214, and stack 242) comprise an additional connection broker interface 330 to support communications with connection broker 152 as might be used to broker IP addressing, and for 'single sign-on' (SSO) applications. The host computer implementation of stack 300 may comprise a hypervisor interface 340 between VM 160 and management software in hypervisor 190 tasked with VM provisioning and policy functions. Additionally, host computer and UI session processor implementations of stack 300 may comprise PCI-EXPRESS interface 350 to support communications between them.

In an embodiment, the control path between host computer and remote computer implementations of stack 300 comprises slow path stack (SPS) 310, utilized for session signaling. The control path further comprises fast path stack (FPS) 320, utilized for control of the media plane which comprises various virtual channels of compressed image data and peripheral device data. SPS 310 and FPS 320 are each executed at both the host computer 110, 120, and 130, and the remote computer 140. Each stack 310 and 320 is layered, for example, according to the Open Systems Interconnect (OSI) reference model in which each layer encapsulates the packet passed down by a higher layer.

SPS 310 comprises session signaling (SSIG) layer 312 and secure channel (SCHAN) layer 314, underpinned by a reliable Transmission Control Protocol/Internet Protocol (TCP/IP) layer 316. Slow path traffic generally comprises infrequent signaling that is tolerant to scheduling delays, usually set to a lower communication priority than media plane or FPS-related communications. SSIG layer 312 is invoked during session startup and teardown. During session startup, SSIG layer 312 performs a startup handshake involving initial peer contact, peer authentication and negotiation of session parameters (such as encryption keys for FPS 320) with a peer SSIG layer at the other end of the network.

In an embodiment, a protocol comparable to Session Initiation Protocol (SIP), described in SIP specification version RFC 3261, is used by SSIG layer 312 to negotiate media capabilities (e.g., encoder attributes and peripheral device data types) and fast path communication parameters (e.g., encryption keys, security, and the like) using an INVITE handshake and exchange of Application Protocol Data Units (APDU) in conjunction with a Session Description Protocol (SDP), for example a protocol similar to SDP of RFC 4566 and RFC 3264. The SDP defines the session parameters exchanged by the SSIG layer 312 at host and remote computers. The remote computer 140 provides its SDP parameters (SDP offer) in the 'INVITE' APDU, and the server provides parameters (SDP answer) in the 'INVITE_OK' APDU. The SDP answer may include negotiated fast-path and media parameters to be used for the remote computing session. The SDP generally comprises a mix of negotiable and non-negotiable parameters. In an embodiment, the remote computer 140 communicates a set of non-negotiable parameters (e.g., data plane connection IP address and port number(s)) and negotiable parameters (e.g., peripheral device data type and/or encoder attributes) to the peer stack of the host computer (e.g., stacks 250 or 214). The host stack uses the received negotiable parameters to negotiate local settings for the host computer, following which a combination of negotiated parameters and the host stack's non-negotiable parameters (e.g., data plane connection IP address and port number(s)) are communicated back to the remote computer 140 in the subsequent SDP answer. The remote computer 140 then uses the negotiated parameters sent by the peer stack of the host computer for the session.

In various embodiments, the SDP supports negotiation of parameters for User Interface Protocol (UIP) 328, such as data packet encapsulation preferences (e.g., UDP selection), link rate negotiation (e.g., 10 Mbps vs. 100 Mbps), Maximum Transmission Unit (MTU) size negotiation, encryption parameters, and attributes of peripheral device data virtual channels. Such attributes include peripheral data channel enablement switches for USB, audio, image, generic I/O, and Display Data Channel (DDC) data types, and peripheral data attributes, such as encoding method, audio format (e.g., specific Adaptive Differential Pulse Code Modulation (AD-PCM) format), and the like. Once a session setup handshake completes, the SSIG layer 312 maintains a TCP connection with the peer and monitors end-to-end network connection integrity using a client-server keep alive mechanism. The SSIG layer 312 also tears down the remote computing session using a 'BYE' handshake, initiated either by the remote computer 140 or the current host computer (e.g., host computer 110). The secure channel SCHAN layer 314 provides a datagram-like service to higher entities and abstracts lower layer TCP or UDP oriented transport mechanics by accepting APDUs from the higher layer modules, generating packets, and transporting the data over an encrypted TCP socket (e.g., Transport Layer Security (TLS) Secure Socket Layer (SSL)) to the peer SCHAN layer which delivers APDUs to the higher layer modules at the peer.

The FPS stack 320 is generally a lightweight protocol tailored for rapid processing of frequent real-time communications data, consequently commanding a higher queuing and scheduling priority compared to traffic associated with SPS 310. The UIP layer 328 provides reliable and unreliable transport channels for media control information and data, including encryption and transport layer services for image data, peripheral device data, and control channels. The Simple Communications Protocol (SCP) layer 326 provides a connection oriented datagram-like service for setting up a peer-to-peer channel (using an 'INVITE' handshake) and packetizing user data for transport. In the case of underlying unreliable transport, SCP layer 326 implements a retransmit mechanism during the initial connection handshake and, when reliable transport is available, SCP layer 326 uses the provided transport mechanism to guarantee delivery of handshake-related packets to the SCP peer. SCP layer 326 provides Segmentation and Reassembly (SAR) services and multiplexing services to enable transport of data sets larger than the maximum permissible MTU size and multiplexing of different peripheral device data types over common virtual channels.

The media control layer 324 provides a datagram service and abstracts the UIP transport details from codec control layer 322 and the codecs 210, 212, 224 or 240. End-to-end control communications are provided over a combination of reliable and unreliable control channels, typically at least one control channel designated for each virtual channel of the remote computing session. The media control layer 324 uses the SCP layer 326 to encapsulate control information into SCP packets and provide a set of bidirectional channels between the host computer (e.g., host computer 110) and remote computer 140. Codec control layer 322 includes modules such as USB, audio, imaging, DDC, and generic I/O modules tasked with negotiating codec settings and configuring the codecs 210, 212, 224 or 240. Each module comprises a list of the attributes of the related codec(s), such as specific device support (e.g., device type), features (e.g., number of displays), capabilities (e.g., audio capabilities, I/O buffer depth, and the like) and encoding attributes.

Encryption is accomplished by encrypting packets prior to MAC transmission. In an embodiment, encryption properties of SPS 310 are managed at secure channel layer SCHAN 314, while those of FPS 320 are managed by the UIP 328.

FIGS. 4A and 4B illustrate the peer-to-peer relationship between corresponding layers of SPS 310 and FPS 320 in accordance with one or more embodiments of the present invention. Considering first the slow path depicted in FIG. 4A, SPS $310_1$ and SPS $310_2$ form the endpoints of a network session, one stack resident on remote computer 140 and the other resident on a current host computer (e.g., host computer 110) of system 100. Corresponding SSIG layers $312_1$ and $312_2$ exchange APDU data over peer-to-peer connection 410, SCHAN layers $314_1$ and $314_2$ exchange secure channel information over peer-to-peer link 412, and underlying TCP/IP layers $316_1$ and $316_2$ form secure TCP sockets 414 in both directions.

Turning next to the fast path depicted in FIG. 4B, FPS $320_1$ and FPS $320_2$ form a fast path between remote computer 140 and the current host computer (e.g., host computer 110). Corresponding codec control layers $322_1$ and $322_2$ exchange APDU data over peer-to-peer connection 420, media control layers $324_1$ and $324_2$ form peer-to-peer control channels 422, and corresponding UIP layers $328_1$ and $328_2$ form peer-to-peer UIP channels 424 for communication of compressed image and peripheral device data over virtual channels.

Figure 5:
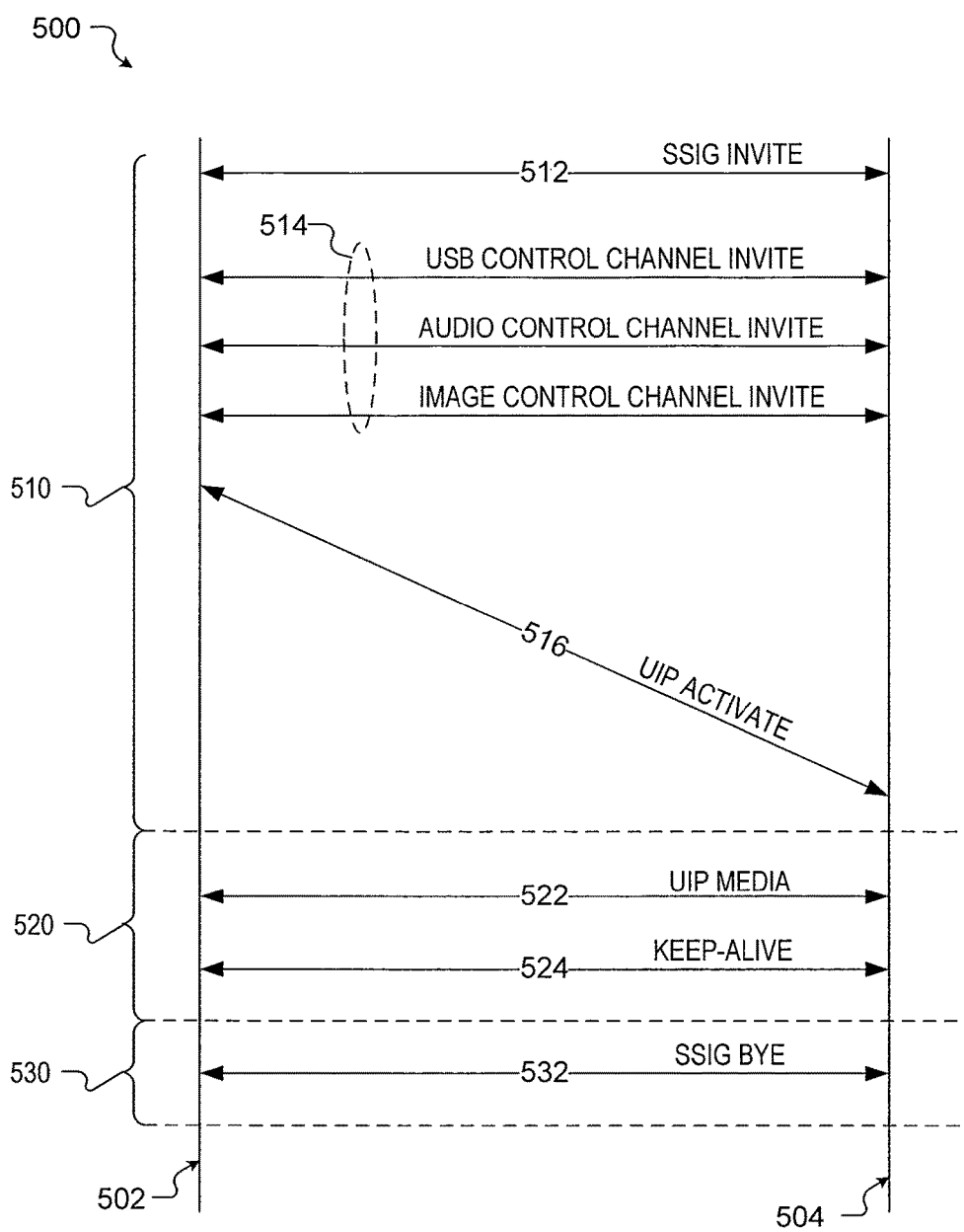
FIG. 5 illustrates three general phases of a network session management method in accordance with one or more embodiments of the present invention.

FIG. 5 illustrates three general phases of a network session management method 500 in accordance with one or more embodiments of the present invention. The network session management method 500 is between a remote computer, e.g., a remote computer 140 of FIG. 1, (depicted as vertical line 502) and a host computer (e.g., host computer 110 of FIG. 1, depicted as vertical line 504) as initiated and terminated using SSIG. During initial session establishment phase 510, secure channel layers open a signaling channel using an 'INVITE' handshake as step 512. As a next step 514, one or more media control channels are established, e.g., establishment of USB, audio, and/or image control channels using 'INVITE' handshaking. In an embodiment, a reliable control channel is established to support flow control and parameter exchange for each enabled data type, and an unreliable control channel is established to support select best-efforts flow control (e.g., an unreliable control channel may be used for flow acknowledgement of resilient data types, such as sub-sections of image frames tolerant of communication errors, whereas reliable control channels may be used for state-dependent data types, such as USB data that requires reliable communications). As a final step 516 in session establishment, the UIP channel is activated and the virtual channels in the data plane start transporting peripheral device data and image data packets.

During the active remote computing session (phase 520), there is an ongoing exchange of media between the host computer 110 and the remote computer 140 as step 522, in conjunction with periodic keep-alive signaling 524 used to detect session failure. During session teardown phase 530, either the host computer 110 or the remote computer 140 initiates 'BYE' handshaking as step 532 for graceful termination of the session.

Figure 6:
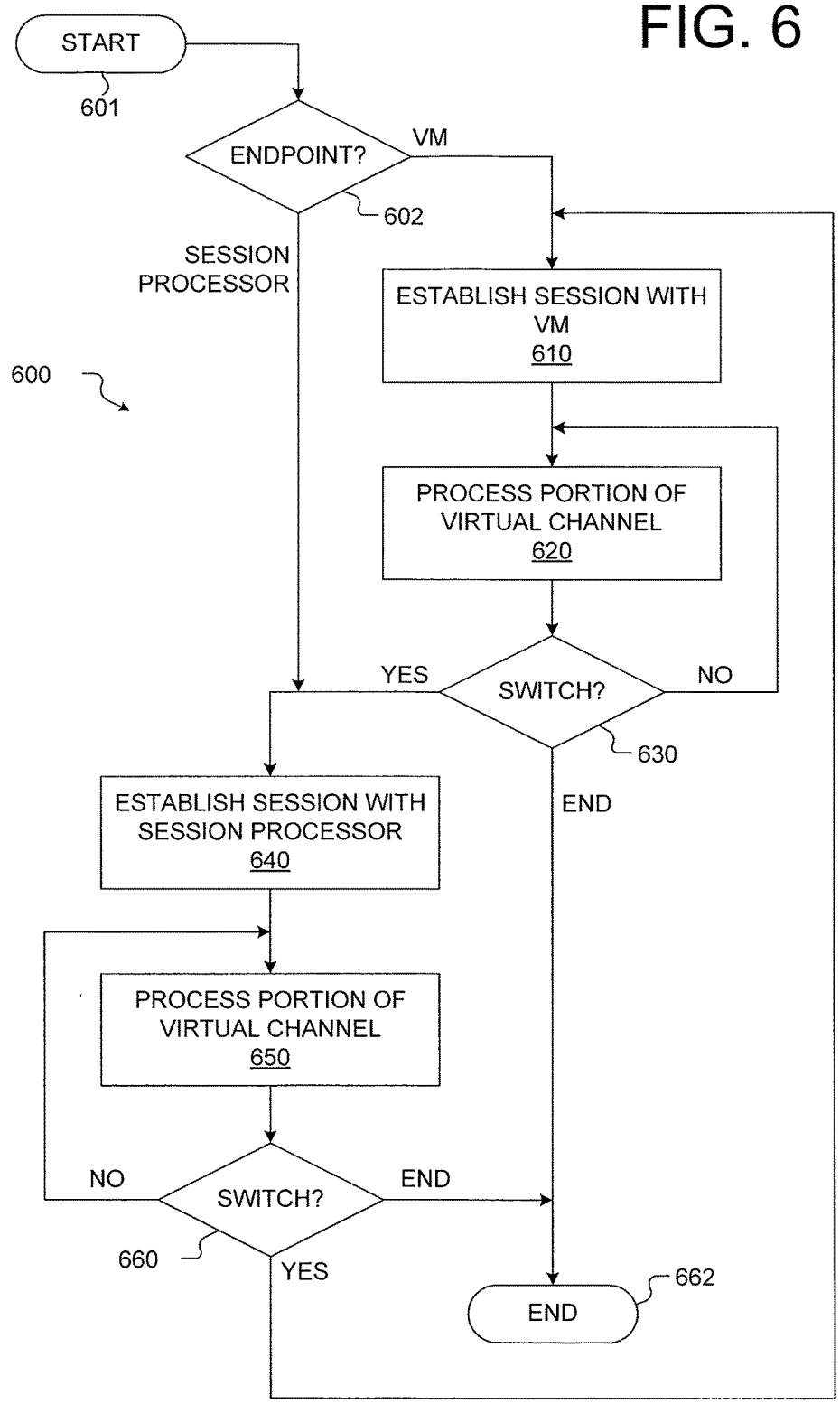
FIG. 6 illustrates an embodiment of a method for transitioning a processing function between a virtual machine (VM) and a User Interface (UI) session processor at a host computer.

FIG. 6 illustrates an embodiment of a method 600 for transitioning a processing function between a VM (ref. codec 180 of VM 160 in FIG. 1) and a UI session processor (ref. codec 182 of processor 114 in FIG. 1) at a host computer (ref. host computer 110 of FIG. 1). The processing function transitioned is one of at least one processing functions associated with a remote computing session.

The method 600 starts at step 601 and proceeds to step 602 ("Endpoint?"). At step 602, it is determined if the network session portion of a remote computing session between a VM 160 on the host computer 110 and the remote computer 140 is to be terminated by a communication stack (ref. stack $250_1$ in FIG. 2) of the host computer's processor system (ref. host processor $112_1$ of FIG. 1) or terminated by a communication stack of the UI session processor 114 (ref. stack $214_1$ in FIG. 2). Such a determination is based on any of several requirements in various embodiments, including default configuration preferences (e.g., administrator settings or user profile information), network characteristics (e.g., network bandwidth availability), security requirements (e.g., encryption level), processor migration flexibility requirements, or availability of resources of the VM or UI session processor. Such resources include processing bandwidth, memory availability, security processing functions, and codec functions.

In some embodiments, it is determined at step 602 that the network session should be terminated at the UI session processor 114, and the method 600 proceeds to step 640. Such a determination may be made, for example, if the host processor $112_1$ is deemed to have resource constraints rendering it desirable to offload one or more media processing functions (such as image compression) to UI session processor codecs (ref. codecs 212 of FIG. 2). In an embodiment in which a high perceptual quality is demanded (e.g., specified by a particular remote computing user profile), high image frame throughput and optimum compression are achieved by proceeding to step 640 if a high network bandwidth availability is detected. In another embodiment where it is determined that the remote computing session has relatively simple image compression requirements (e.g. revealed by the absence of graphics intensive applications in a software application profile for a particular remote computing session), it may be preferable to use VM codecs (ref. codecs $210_1$ in FIG. 2), in which case method 600 proceeds to step 610 ("Establish session with VM"). In another embodiment, communication stack functions are partitioned between the UI session processor 114 and the VM 160, and a local interconnect (ref. interconnect 254) is used to bridge the two partial communication stacks. In one such case, stack $250_1$ of the VM 160 and associated hypervisor manage physical layer and data link layer communications (e.g., Ethernet and MAC protocols) while stack $214_1$ of the UI session processor 114 manages transport (e.g., TCP/IP or UDP/IP) and higher layer protocols. Such partitioning is useful prior to migration of the remote computing session to a different host processor because migration functions inherent in the virtualization infrastructure may be used to manage live migration.

In some embodiments, it is determined at step 602 that the network session should be terminated at the host computer's host processor, and the method 600 proceeds to step 610 ("Establish session with VM") to establish a network session between the remote computer 140 and a network interface of the host processor $112_1$ utilizing, for example, an IP connection at the host processor $112_1$ (ref. connection 170 in FIG. 1). Such a network session (typically comprising MAC address, IP address, destination port number, and negotiated codec parameters for each endpoint) is established using negotiations such as the SIP session establishment of the method 500 in FIG. 5. If a previously established network session between the remote computer 140 the VM 160 remains open (e.g., on return from step 660), session attributes, such as codec parameters, are renegotiated if required and method 600 proceeds to step 620.

At step 620 ("Process portion of virtual channel"), one or more data streams from one or more virtual channels are processed by software in the VM domain and communicated to the remote computer 140. In the case of a virtual channel comprising display image data, the desktop display image is rendered in a frame buffer by graphics software (with optional GPU support), compressed by a software image processing codec of the VM 160 (using lossy and/or lossless image compression methods), assembled into packets (utilizing communication stack $250_1$), and communicated over the network using connection 170. In the case of an audio virtual channel, output audio data is retrieved from audio buffers, optionally compressed by an audio codec of the VM 160, such as an ADPCM codec (ref. codecs $210_1$), assembled into packets, and communicated to the remote computer 140, also via communication stack $250_1$ and connection 170. While different media types generally use different virtual channels within a common session designation, some embodiments multiplex different media types (identified by sub-packet header) within a single virtual channel. Ingress virtual channel data is subjected to similar processing in the opposite direction.

The method 600 proceeds to step 630 ("Switch?"), where it is determined if the remote computing session should be transitioned to an underlying network session terminated by UI session processor 114. If a switch is required, method 600 proceeds to step 640 in order to engage one or more functions of UI session processor 114. Such a switch may be triggered by any of several requirements or system status changes. For example, a switch might be triggered by a bandwidth threshold for a virtual channel, according to recent history, or anticipated demand. The data bandwidth may exceed a threshold for any of several reasons such as increased bit rate or frame update rate when switching to a high performance graphics application, such as a CAD application. In another embodiment, a threshold is triggered when frame updates are dropped as a consequence of image compression functions lagging the display update rate due to insufficient processing resources, increased image complexity, or increased loading of the CPU by other software. In another embodiment, such a switch is triggered by the advertised availability of previously allocated codec resources in the UI session processor 114. Yet another trigger might be a change in remote computing session attributes (such as a change in the graphics software application, a change in graphics or audio fidelity requirements, or a change in peripheral device configuration, such as the addition of a display device).

If, at step 630, it is determined that a switch is required, the method 600 proceeds to step 640 ("Establish session with session processor) to establish a network session between the remote computer 140 and the UI session processor 114 in anticipation of communications using UI session processor functions. If a previously established network session has not been terminated, for example on a second or subsequent pass through step 640, method 600 proceeds directly to step 650 if session attributes are unchanged or session parameters are re-negotiated if necessary.

The method 600 proceeds to step 650 ("Process portion of virtual channel"), in which case data associated with one or more virtual channels is processed by UI session processor 114. In an embodiment of a virtual channel comprising display image data, the desktop display image is rendered in a frame buffer of VM 160, communicated to UI session processor 114 over interconnect 254, compressed by an image codec 212, assembled into packets utilizing stacks 214, and communicated over interconnect 172 to the remote computer 140. In the case of an audio stream, output audio data is retrieved from audio buffers of VM 160, optionally compressed either using a codec element of VM 160 or an audio codec 212, assembled into packets, and communicated over the network. As with host-assembled packets, each virtual channel may comprise one or more media types and packets may be communicated according to priorities, such as media type and latency requirements.

The method 600 proceeds to step 660 ("Switch?") during which it is determined if the remote computing session should be transitioned to an underlying network session associated directly with the VM 160; alternatively, it may be determined whether to transition the remote computing session to a different VM of host processor $112_1$, If the result of such determination is yes, method 600 proceeds to step 610 to engage one or more processing resources of the VM 160. A switch to host processor $112_1$ may be motivated by various reasons, such as the data bandwidth of a virtual channel falling below a determined threshold, a codec resource of UI session processor 114 becoming under-utilized (e.g., less complex image processing requirements), a codec resource of UI session processor 114 being allocated to higher priority channels, processing resources of host processor $112_1$ becoming available, or changes in the remote computing session (e.g., changes in graphics or audio fidelity requirements, change in peripheral device or display configuration, changes in software application, or the like). The bandwidth associated with a compressed image virtual channel may fall for any of several reasons, including when the output bit rate or frame update rate of the image application decreases upon termination or suspension of a high performance graphics application, when a display is unplugged, or when a user stops interacting with the system. In one embodiment, a switch is initiated in preparation for live migration of VM 160 (e.g., from VM 160 in FIG. 2 to VM 222 in FIG. 2) and the IP address associated with the remote computing session is also migrated to the new VM instance.

If, at step 660, it is determined that a switch is not required, the method 600 returns to step 650. If, at step 660, it is determined to end the method 600, for example when the remote computing session is suspended or terminated, the method 600 proceeds to step 662 where it ends.

Figure 7:
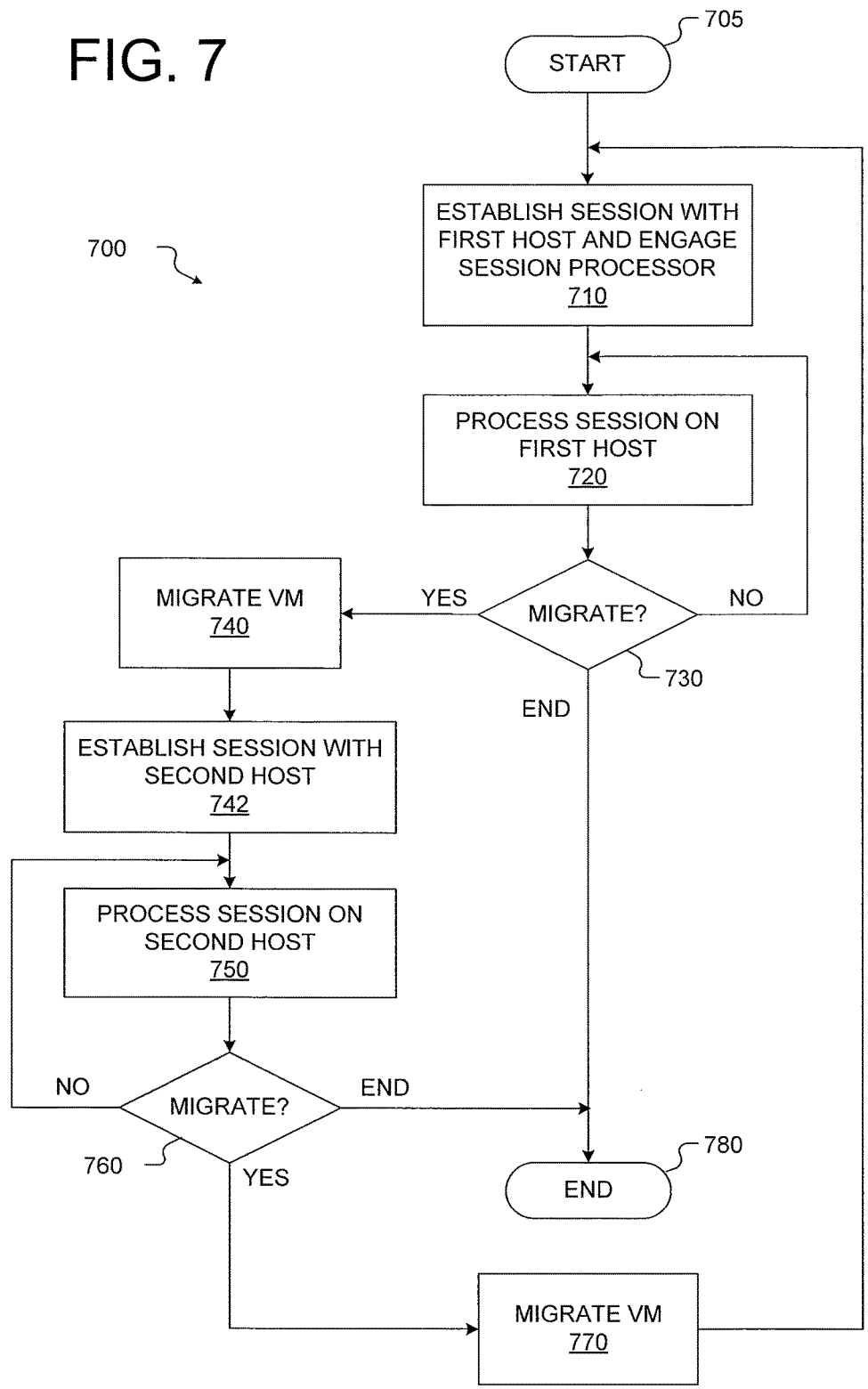
FIG. 7 illustrates an embodiment of a method for migrating a remote computing session, the remote computing session using at least one codec function of a UI session processor, from one host computer to another.

FIG. 7 illustrates an embodiment of a method 700 for migrating a remote computing session, the remote computing session using at least one codec function of a UI session processor, from one host computer to another. One example of such a migration is the migration of VM 160 in FIG. 1 from host computer 110 to host computer 120 (utilizing migration path 162 in FIG. 1) or to host computer 130 (utilizing migration path 164 in FIG. 1).

The method 700 starts at step 705 and proceeds to step 710 ("Establish session with first host and engage UI session processor"), where a remote computing session is established between a remote computer (ref computer 140 in FIG. 1) and VM 160 of host computer 110. In an embodiment, the VM 160 establishes a network session with the remote computer using a connection (ref. connection 170 in FIG. 1) in response to a connection request, generally supported by a connection broker (ref. connection broker 152 in FIG. 1). The network session is then transitioned to a UI session processor (ref processor 114 in FIG. 1) of the host computer 110 in conjunction with a connection (ref. connection 172 in FIG. 1). The VM 160 is tasked with select peripheral device data processing functions (e.g., audio codec and USB codec functions), while the UI session processor 114 is tasked with other select data processing functions, such as image compression, data handling, packet processing, and security functions. In another embodiment, the connection broker 152 (and/or remote computer) negotiates connection requirements (such as security level, security keys, codec parameters, image quality requirements, network bandwidth constraints, latency requirements, target frame rate, and the like) with the VM 160. Such requirements may be communicated to UI session processor 114 via local bus infrastructure (ref. interconnect 254 in FIG. 2), and the network connection supporting the remote computing session is established between the remote computer 140 and the UI session processor 114. In another embodiment, the VM 160 establishes a network connection with the remote computer 140 but engages UI session processor 114 as a co-processing resource (e.g., an image processor).

As a next step 720 ("Process session on first host"), the remote computing session established in step 710 is maintained as depicted for step 520 depicted in FIG. 5.

As a next step 730, it is determined whether the VM 160 hosting the remote computing session should be migrated to a second computer (ref. computer 120 in FIG. 1; alternatively, computer 130 in FIG. 1 may be utilized), as generally pre-empted by server maintenance requirements, load balancing needs, or changed computing demands. If no migration is required and it is determined that the session should continue, method 700 continues utilizing the first host at step 720 or, if it is determined at step 730 that the session should end, the method 700 proceeds to step 780 where it ends. If a VM migration is required, method 700 proceeds to step 740 ("Migrate VM"). At step 740, the state information associated with VM 160 is migrated to a VM (e.g., VM 222 of FIG. 2 or, alternatively, VM 232 in FIG. 2 when migration to host computer 130 is performed) using VM migration techniques known to the art, such as VMWARE's 'VMOTION' technology.

As a next step 742 ("Establish session with second host"), a remote computing session is established between the remote computer 140 and the VM 222, generally involving a new connection established between the remote computer 140 and either a host processor or a UI session processor associated with the migrated VM.

In some embodiments in which VM 160 uses connection 172 as a network connection to the remote computer 140, a bridging network session is established between VM 160 and the remote computer 140 using connection 170 (but having the same IP address and security credentials as connection 172) as an intermediate migration step, and the connection 172 may be suspended. Codec resources of VM 160 (ref. codecs $210_1$) may also be engaged as an intermediate measure to minimize service disruptions during session migration to the second host computer 120. The bridging network session is then redirected from host computer 110 to the target host computer (i.e., host computer 120) using the same IP address. Once a network session has been established between the host computer 120 and the remote computer 140 (i.e., using a connection 174 of FIG. 1) local UI session processing resources are engaged. Alternatively, once a network session has been established between the host computer 130 and the remote computer 140 (i.e., using a connection 178 of FIG. 1) software services executed by the host processor 132 provide session processing functions. In an embodiment, VM 160 is migrated to a host processor (e.g., host processor 122 of FIG. 1) and connection 174 is used as a temporary communications link until a UI session processor of host computer 120 (e.g., UI session processor 124 of FIG. 1) is engaged, following which a connection such as connection 176 of FIG. 1 forms the network connection between UI session processor 124 and the remote computer 140. Much of the state information pertaining to the remote computing session (e.g., codec parameters and the like) may be stored in the VM domain and communicated to the target host computer (i.e., host computer 120) within the context of the VM migration. However, select state information local to the UI session processor 114, may be moved to the second host computer 120 via data storage structures on the remote computer 140 or the connection broker 152.

As a next step 750, the remote computing session is continued between the newly established VM 222 and the remote computer 140, using a combination of VM and UI session processor processing resources if available.

As a next step 760 ("Migrate?"), it is determined if the remote computing session shall be moved back to the first computer 110 (or, alternatively, another host computer). If migration is required, method 700 proceeds to step 770 ("Migrate VM") in which case VM 222 (or, alternatively, VM 232 if migration to host computer 130 occurred) is migrated again, following which a network session is established with the new host as a repeat of step 710.

If, at step 760, it is determined that no migration is required and that the session should continue, the method 700 proceeds to step 750. If, at step 760, it is determined that the session should end, the method 700 proceeds to step 780 where it ends.

Figure 8:
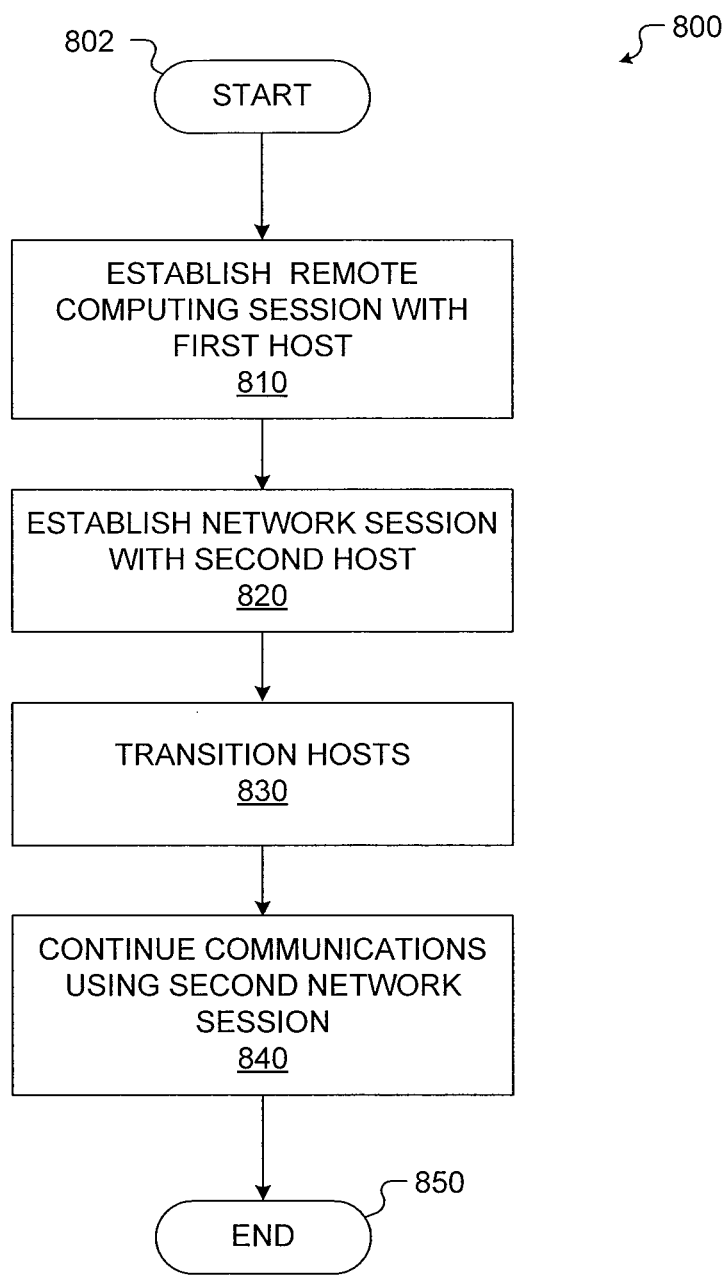
FIG. 8 illustrates a method for transitioning a remote computing session from one VM to another VM in accordance with one or more embodiments of the present invention.

FIG. 8 illustrates a method 800 for transitioning a remote computing session from one VM to another VM in accordance with one or more embodiments of the present invention. The method 800 is executed by a remote computer (ref computer 140 in FIG. 1) to transition the remote computing session from one source VM to another target VM while maintaining a perceptually consistent local display image quality through the transition. Method 800 starts at step 802 and proceeds to step 810 ("Establish remote computing session with first host"). At step 810, a remote computing session is established between the remote computer 140 and a source VM (ref. VM 160 in FIG. 1), using a UI session processor (ref. UI session processor 114 in FIG. 1) and an associated network connection (ref. connection 172 in FIG. 1) in conjunction with session management process 500. Once a remote computing session is established, compressed image data and peripheral device data is communicated using virtual channel data structures as previously described.

As a next step 820 ("Establish network session with second host"), a network session is established between the remote computer 140 and a UI session processor coupled to the host processor of a target VM (ref. UI session processor 124 coupled to target VM 222 of host processor 122$_1$ on host computer 120 as depicted in FIG. 2). In an embodiment, session processor management software in the hypervisor domain 190 associated with the source VM 160 is notified of an imminent migration of source VM 160 to target VM 222, following which data handling and codec functions may be reverted from UI session processor 114 to VM 160 as an intermediate step. The hypervisor 190 or connection broker 152 passes credentials, such as address and security information for the target UI session processor 124, to the remote computer 140. Thereafter, the remote computer 140 establishes a second network session with the UI session processor 124, negating a need for further network session negotiation after the source VM 160 has been migrated to the target VM 222. The UI session processor 114 may preserve session state information, such as session parameters associated with a communications stack (ref. stack 214$_1$ in FIG. 2), by pushing such information into the VM domain. The information pushed into the VM domain is migrated in conjunction with the migration of the VM 160, pushing the information to the connection broker or pushing the information to the remote computer 140, following which the network session established between the remote computer 140 and the UI session processor 124 uses the retained state information. In some embodiments, the remote computing session established between the remote computer 140 and the second host computer (i.e., host computer 120) uses the same IP address as the initial session. In other embodiments in which the remote computer 140 transitions a network connection from one UI session processor to another (i.e., transition from connection 172 to a connection such as connection 176 in FIG. 1), the second session generally comprises different MAC and IP addresses.

As a next step 830 ("Transition"), the remote computer 140 transitions from the first network session to the second network session in response to instructions issued by the target UI session processor 124, session processor management software on the target host processor 122$_1$, or the connection broker when VM migration is complete. In an embodiment, both host processors 112$_1$ and 122$_1$ concurrently communicate compressed image data and peripheral device data using both network sessions (i.e., engaging both the initial and target UI session processors 114 and 124, respectively, during a negotiation phase) and redundant data may be discarded once the transition has completed. In another embodiment, data is switched from one network session to the other and expired data associated with the first session is discarded once the transition has completed.

As a next step 840, communication is continued between the remote computer 140 and the target VM 222 using the second established network session. The method 800 proceeds to step 850, where it ends.

Figure 9:
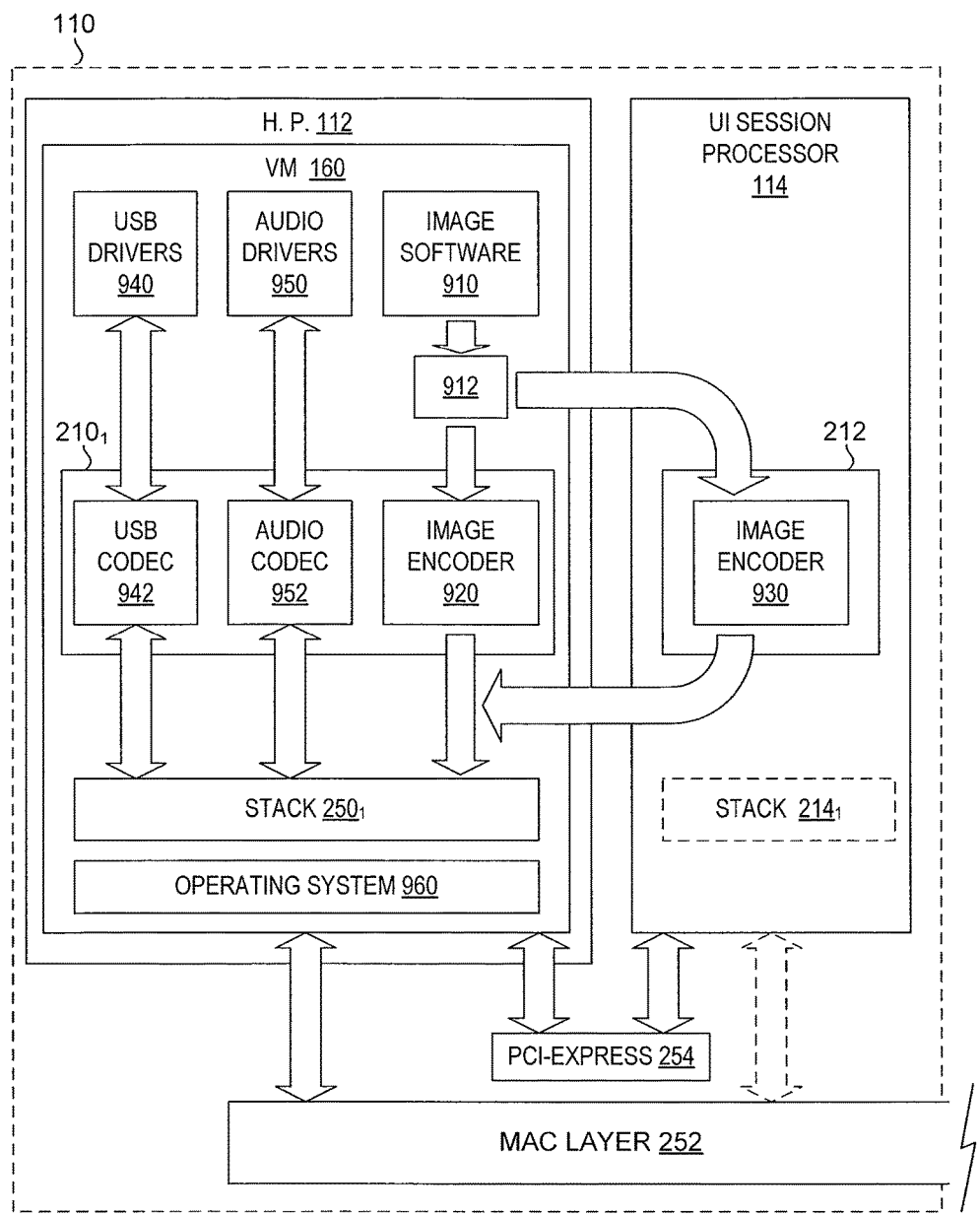
FIG. 9 illustrates select details of a host computer enabled for dynamic transition between software and hardware offload image encoders in accordance with one or more embodiments of the present invention.

FIG. 9 illustrates select details of a host computer 110 enabled for dynamic transition between software and hardware offload image encoders in accordance with one or more embodiments of the present invention. The host computer 110 is enabled to respond to immediate image encoding and resource allocation requirements using dynamic transition between software (i.e., VM-based) and hardware offload (i.e., UI session processor-based) image encoders. FIG. 9 shows various software structures of VM 160 used to support a remote computer 140 having display, USB, and audio peripheral devices. These structures serve to process, generate, and/or consume data associated with virtual channels terminated by stack 250$_1$. Such structures may include native WINDOWS, UNIX, or LINUX software structures or modified drivers dependent on the type of hypervisor and virtualization approach implemented.

Image software 910, USB drivers 940 and audio drivers 950 execute under management of operating system 960. Image software 910 generally includes one or more well known executable applications with image display presentation requirements, such as word processor, spreadsheets, video/photo editing software, graphics software (such as Desktop Publishing (DTP) software), or the like and underlying graphics drivers used to render related dynamic image display representations as pixel data in one or more frame buffers. USB drivers 940 generally comprise well known USB device drivers, USB core, and/or hub drivers and data structures, such as USB Request Blocks (URBs) associated with remote USB devices and software of VM 160 that use such devices. Audio drivers 950 generally comprise well known software and data structures, such as Command Output Ring Buffer (CORB) and/or Response Input Audio Buffer (RIRB), for managing the flow of audio data between underlying audio codecs and audio application software.

USB codec 942 generally comprises well known USB-over-IP communication software, including a virtualized host controller interface (VHCI) that operates in conjunction with stub- and host controller drivers at the remote computer 140 to service physical USB bus controllers and peripheral devices. Audio codec 952 typically comprises one or more audio processing functions, such as Differential Pulse Code Modulation (DPCM) coding, decimation, interpolation, uLaw/aLaw encoding, rice encoding, silence suppression, acoustic echo cancellation, packet loss concealment function, and the like. In some embodiments, codec 942 and/or codec 952 may provide functions such as data ordering, transport or play-out timing, or error handling functions when these functions are not handled by underlying stack 250$_1$.

Image encoder 920 performs image encoding operations, such as one or more of image analysis (e.g., image type decomposition), image transform, text encoding, picture encoding, background encoding, progressive quantization, video encoding, and binary encoding suited to the encoding requirements of computer display image content. Image encoder 920 generally executes lossy and/or lossless compression of raster-ordered pixel data located in frame buffers updated by graphics software. Each frame buffer is typically partitioned into logical sections, such as blocks or slices of an image frame and updated areas (e.g., changed areas as designated by a dirty bit mask) are independently encoded and passed to stack $250_1$ for communication to the remote computer 140. The encoding method (i.e., lossy vs. lossless encoding) is generally selected according to image type information (e.g., background, text, picture, video or object types) determined by spatial and temporal features, such as contrast, color content, or other suitable parameters, and/or analysis of drawing commands executed by graphics software. Lossy encoding techniques may include wavelet encoding, Discrete Fourier Transform (DCT), Moving Picture Expert Group (MPEG), Joint Photographic Expert Group (JPEG) methods, while examples of suitable lossless techniques include Golomb, Rice, Huffman, variable length encoder (VLC), context-adaptive VLC, or context-adaptive binary arithmetic encoder (CABAC) methods. Image encoder 920 may retain encoding state information for select logical partitions, thereby enabling the implementation of progressive encoding methods suited to management of network bandwidth consumption.

Image encoder 930 of UI session processor 114 generally comprises a hardware-optimized image encoding pipeline with lossy and lossless image compression functions that generates encoded image packets with the same decoder requirements as encoded image packets generated by image encoder 920. Image encoder 930 typically processes logical image sections according to the same section boundary definitions used by image encoder 920, thereby enabling different portions of image frames to be processed by either image encoder 920 or 930, or enabling mid-frame switching from one encoder to the other in a manner transparent to the image decoder at the remote computer 140. Structural details for such an image encoder 930 are disclosed in commonly assigned, co-pending patent application Ser. No. 12/657,618, filed Jan. 22, 2010, entitled "System and Method for Managing Multiple User Interface Sessions", by Charles Peter Baron, David Victor Hobbs, Christopher Lawrence Topp, and Edlic Yiu. A method for transferring image updates generated by a virtualized frame buffer of VM 160 is disclosed in commonly assigned co-pending U.S. patent application Ser. No. 12/586,498, entitled "System and Method for Transferring Updates from Virtual Frame Buffers" and filed Sep. 23, 2009, which is also incorporated in its entirety by reference.

Figure 10:
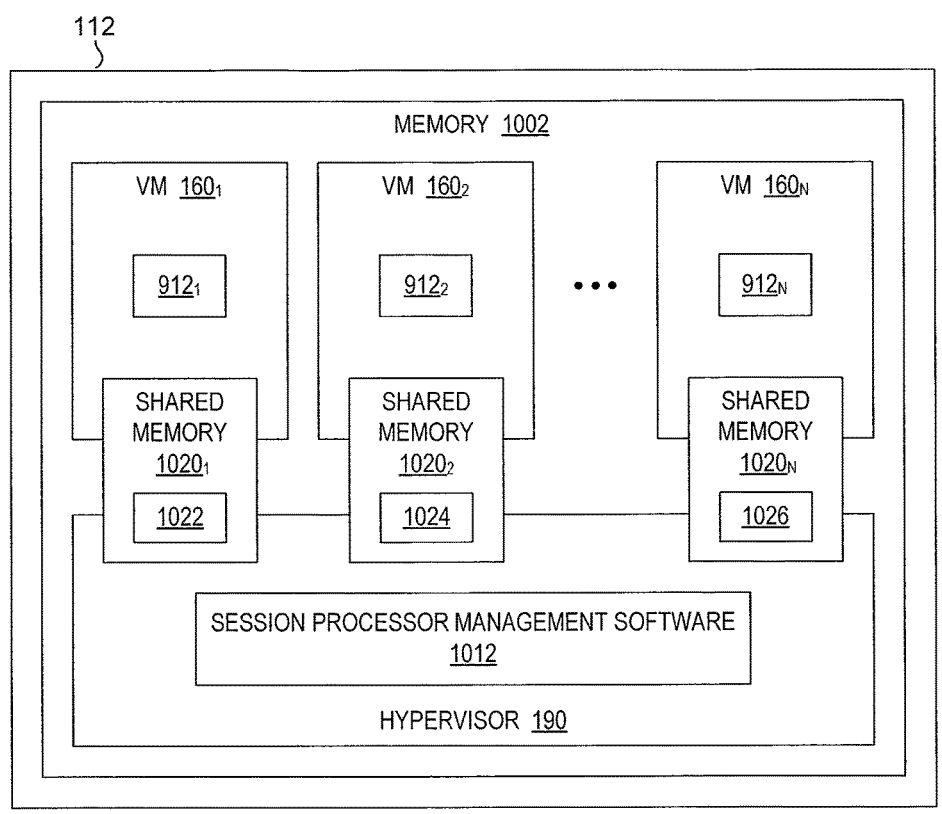
FIG. 10 is a block diagram illustrating communication structures within a memory of a host processor in accordance with one or more embodiments of the present invention.

Distributor 912 comprises machine executable instructions enabled to switch encoding of a particular logical image section or frame between image encoders 920 and 930. In some embodiments, distributor 912 operates in conjunction with session processor management software located in the hypervisor domain to make a dynamic determination as to which encoder resource (i.e. image encoder 920 or 930) to engage; one such embodiment is depicted in FIG. 10. Distributor 912 engages either image encoder 920 or 930 on a per-frame or per-section basis according to compression requirements and status of the UI session processor 114. In some cases, distributor 912 may use image type information (e.g., as determined from graphics instructions or image analysis) to select the optimal encoder for an image section, frame, or sequence of frames. As an example, a video section or a frequently changing picture region of an image may be offloaded to image encoder 930, while infrequently updated background sections may be processed by image encoder 920. As another example, a video window within an image frame is distributed to image encoder 920 where Multimedia Redirect (MMR) techniques are used to forward the source video stream to the remote computer 140 rather than re-encoding an output image from the frame buffer of VM 160.

Image sections encoded by image encoder 930 are returned as packets (typically back to VM 160) which are multiplexed with packets from image encoder 920, if necessary, and communicated to the remote computer 140 using a host processor network interface (ref. switch 116 in FIG. 1) in conjunction with stack 250. In some embodiments where at least part of stack 250 is executed outside the domain of VM 160 (such as a virtualized network switch similar to CISCO model NEXUS v1000), image sections encoded by image encoder 930 may be forwarded directly to such switching infrastructure.

FIG. 10 is a block diagram illustrating communication structures within a memory of a host processor 112 in accordance with one or more embodiments of the present invention. Host processor 112 comprises memory 1002, which comprises a plurality of VMs (depicted as VM $160_1$, VM $160_2$, and VM $160_N$) sharing a common host processing platform and associated CPU resources. Each VM 160 typically comprises the software structures illustrated for VM 160 in FIG. 9; for example, each VM 160 comprises a distributor 912 (i.e., VMs $160_1$, $160_2$, and $160_N$ comprise distributors $912_1$, $912_2$ and $912_N$, respectively). Host processor 112 may accommodate numerous VMs 160 (e.g., as many as 128 in some embodiments) supported by a common hypervisor 190. In an embodiment, each VM 160 is communicatively coupled to the hypervisor 190 by a separate shared memory structure 1020 (i.e., VMs $160_1$, $160_2$ and $160_N$ are coupled to the hypervisor 190 by shared memory $1020_1$, $1020_2$, and $1020_N$, respectively).

The hypervisor 190 comprises session processor management software 1012, which comprises functions for detection and initialization of UI session processor 114 and functions for managing individual image compression channels. Such functions include setup and teardown functions which generally operate in tandem with management firmware local to UI session processor 114 to allocate and de-allocate image data queues, descriptors, scratch memory, and encoder pipeline resources on a dynamic basis. In some embodiments, UI session processor 114 provides ongoing allocation statistics, such as data queue lengths, output frame update rates, aggregate encoded image quality information, power consumption information, or retransmission statistics, to management software 1012. Such allocation statistics are used in conjunction with CPU performance information provided by the hypervisor 190, network characteristics, and administrator settings (such as user-assigned resource priorities) to determine future encoding resource allocation for new VMs 160. Additionally or alternatively, such allocation statistics may be used to redistribute current encoding resources to achieve load balancing or display image quality objectives.

At startup, session processor management software 1012 detects the presence, availability, and operation state of UI session processor 114, which is presented to the distributors $912_1$, $912_2$ and $912_N$ using status parameters 1022, 1024, and 1026, respectively, in shared memory $1020_1$, $1020_2$ and $1020_N$, respectively. A particular distributor 912 selects a software image encoder 920 or hardware image encoder 930 as instructed by session processor management software 1012. In an embodiment, status parameters 1022, 1024, and 1026 comprise a two-way data structure for communication of encoding requirements from the VM 160 to the session processor management software 1012, as well as communication of encoding timing information and encoder selection from the session processor management software 1012 to the distributor 912. As an example, the status parameters 1022, 1024, and 1026 are used to instruct distributors 912 to engage image encoder 930 in the face of high CPU demand by other VMs 160 or poor network reliability where a high retransmission frequency is anticipated. As another example, distributor 912 is instructed to revert to the VM software image encoder 920 in response to an anticipated drop in encoding requirements, such when a particular user suspends a graphics intensive software application or engages software such as a screensaver designated for reduced image quality.

In the event that a VM 160, such as VM $160_1$, is migrated to a different host processor or different host computer, distributor $912_1$ (operating on the new computer) detects the presence of session processor management software in the new environment. The availability and status of a UI session processor is determined via ongoing polling of the status parameters 1022 by the VM $160_1$. The UI session processor may be a new one (i.e., where the VM 160 is migrated to a different host computer) or the same one (i.e., where VM 160 is migrated to a different host processor on the same host computer). Given that the VM $160_1$ may be generally unaware of a live migration event, status parameters 1022 are used to provide an indication of a loss of connection with UI session processor 114 and a corresponding requirement to immediately revert to the VM software image encoder.

In some direct-mapped virtualization models, at least some of the functionality of session processor management software 1012 may be executed as firmware by the UI session processor 114 itself and distributors 912 may exchange status parameters 1022, 1024, and 1026 directly with the UI session processor 114. In other embodiments, at least some of the functionality of session processor management software 1012 may be executed by a connection broker.

Figure 11:
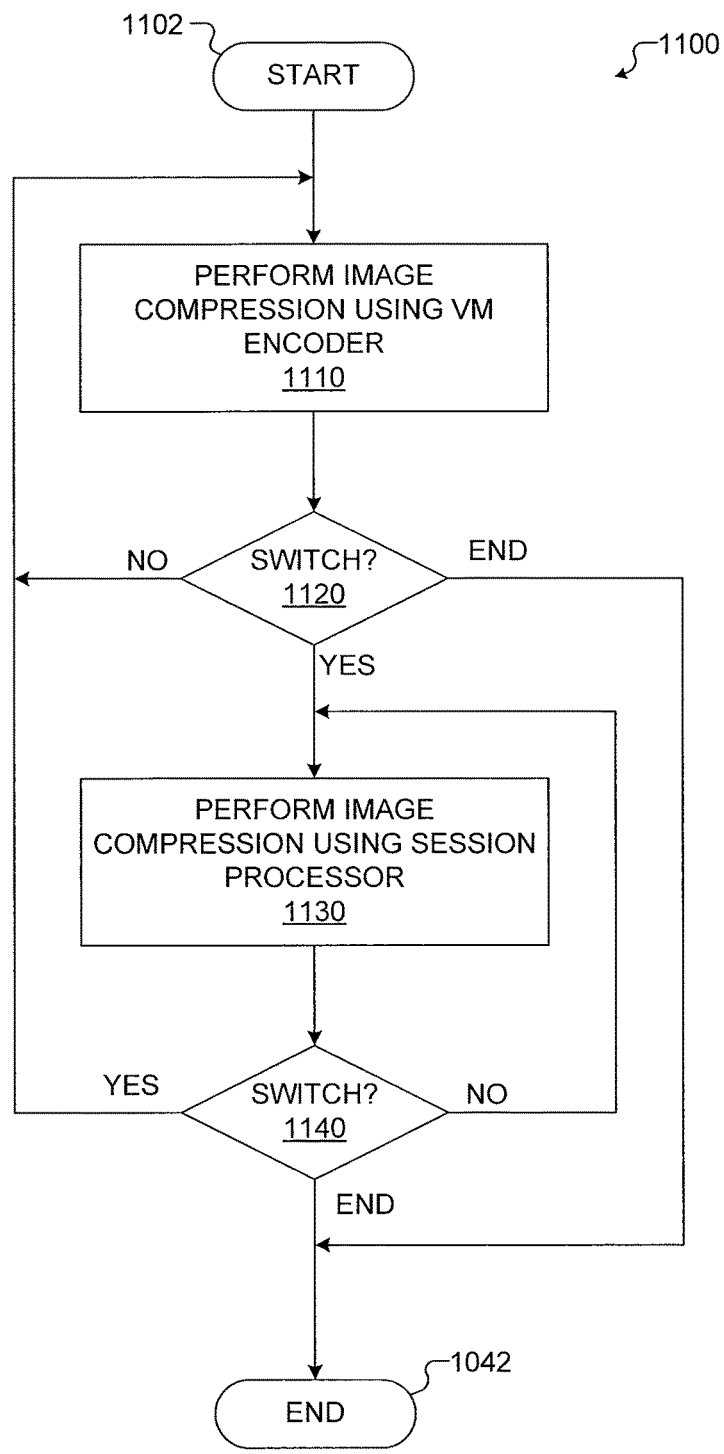
FIG. 11 illustrates a method for switching or distributing image compression between image encoding resources of a VM and image encoding resources of a UI session processor in accordance with one or more embodiments of the present invention.

FIG. 11 illustrates a method 1100 for switching or distributing image compression between image encoding resources of a VM and image encoding resources of a UI session processor in accordance with one or more embodiments of the present invention.

Method 1100 starts at step 1102 and proceeds to step 1110 ("PERFORM IMAGE COMPRESSION USING VM ENCODER"). Generally, a VM of a host processor (ref. VM 160 of host processor 112 in FIG. 1) engages it's VM software encoder (ref. image encoder 920 in FIG. 9) following system initialization, and image compression is performed by the VM software image encoder 920 until the VM 160 or UI session processor management software (ref software 1012 in FIG. 10) detects the presence and availability of an image encoder from an attached UI session processor (ref. image encoder 930 of UI session processor 114 in FIG. 9). In cases where step 1110 is executed as a result of a break in communications with the UI session processor 114 (i.e., return from step 1140), synchronization between the VM 160 and a remote computer (ref. remote computer 140 in FIG. 1) may be maintained by re-compressing and transmitting the last display image frame. (Compressed image sections are forwarded to a communications stack for transport to the remote computer 140 in conjunction with other peripheral device data associated with the remote computing session.

Method 1100 proceeds to step 1120 ("SWITCH?") in which the encoding path is evaluated. Such an evaluation may occur on a periodic basis or in response to an interrupt event. In one case, the presence of the UI session processor 114 is detected by session processor management software in the hypervisor domain (ref. session processor management software 1012 in FIG. 10). Additionally, the session processor management software 1012 determines the availability of a hardware offload encoder of the UI session processor 114 (ref. image encoder 930 in FIG. 9), for example, by determining the current number of active channels and performance information (such as update rates and queue depth levels) returned from the UI session processor 114. The session processor management software 1012 notifies control software in the VM domain (ref. distributor 912 in FIG. 9) to switch to the hardware offload encoder (i.e., image encoder 930) to compress part or all of the image data stream. In the absence of a UI session processor 114 or lack of image encoder availability in the UI session processor 114 due to loading by higher priority VMs, process 1100 continues at step 1110. In alternative embodiments enabled by virtualized I/O sub-systems (e.g., INTEL IOV architecture), software in the VM domain may detect the availability and status of the UI session processor 114 directly by probing devices on the PCI-EXPRESS bus (ref. PCI-EXPRESS 254 in FIG. 2) or responding to interrupts.

If, at step 1120, it is determined that a hardware offload image encoder (i.e., image encoder 930) is available, method 1100 proceeds to step 1130 ("PERFORM IMAGE COMPRESSION USING SESSION PROCESSOR"). In some embodiments, the entire image data stream associated with a display image is offloaded to the UI session processor 114 for compression In other embodiments, only one or more sections of the image data stream are offloaded to the UI session processor 114 for compression, as might occur if a video window, fine resolution text, or other designated content type is detected via a change in image content, or when a specified application is launched. In some embodiments, image sections compressed by the UI session processor 114 are returned to the communications stack of the VM 160 prior to transport to the remote computer 140.

Method 1100 proceeds to step 1140 ("SWITCH?") in which the encoding path is again evaluated, either periodically or in response to an event. In various embodiments, such as when the loss of connection to the UI session processor 114 results from VM migration to another host processor, or reprioritization of offload processing by the session processor management software 1012 occurs, method 1100 reverts step 1110 to engage the VM-based software image encoder 920 to compress part or all of the image data stream. Such reprioritization may be related to a degradation in perceived image quality (e.g., a drop in update rate for the compressed image stream), a reduced availability of memory and/or encoding resources on the UI session processor 114, the servicing of higher priority VMs or related to changes in encoding requirement for the current image data stream. In an embodiment where VM migration occurs, offload encoding of an image section initiated by the image transfer control function of distributor 912 results in an error code being returned to status parameters in shared memory (ref. shared memory 1020 in FIG. 10), which prompts reversion to step 1110. Following migration of a VM or termination of a remote computing session that engages the UI session processor 114, the session processor management software 1012 operates in conjunction with management firmware executed by the UI session processor 114 to free local resources such as scratch memory, descriptors, and image data queues in the UI session processor 114 and data structures, stored in the hypervisor 190, related to the VM 160.

If, at either step 1120 or 1140 it is determined that the remote computing session is suspended or terminated, the method 110 proceeds to step 1042 where it ends.

While the foregoing is directed to embodiments of the present invention, other and further embodiments of the invention may be devised without departing from the basic scope thereof, and the scope thereof is determined by the claims that follow.

The invention claimed is:

1. A method for image encoding, comprising:
   encoding a first image portion by a first encoder associated with a first processor at a host system;
   dynamically determining a requirement to encode a second image portion by the first encoder associated with the first processor or by an offload encoder associated with a User Interface (UI) session processor at the host system, wherein the UI session processor comprises a hardware-optimized image encoding pipeline; and
   encoding, based on the requirement, the second image portion by the first encoder or the offload encoder; and
   transferring, when the offload encoder is used, compressed data representing the encoded second image portion from the UI session processor to the first processor, for network transmission,
   wherein the requirement indicates which of using the first encoder or the offload encoder for encoding the second image portion maximizes resource utilization of the host system.

2. The method of claim 1, wherein the second image portion is encoded by the offload encoder to generate an encoded second image portion, and wherein the second encoded image portion is transmitted via the first processor to a remote system remotely located from the host system.

3. The method of claim 1, wherein the requirement is determined based on usage of at least one resource associated with the UI session processor.

4. The method of claim 1, wherein the requirement is determined based on at least one of (i) an assigned priority of a virtual machine (VM) with respect to a plurality of VMs at the host system, wherein the VM comprises the first encoder, or (ii) an image rendering activity level.

5. The method of claim 1, further comprising monitoring the first processor, wherein the requirement is determined based on data obtained by monitoring the first processor.

6. The method of claim 1, wherein the requirement is further determined based on at least one of characteristics of a network coupling the host system to a remotely located remote system, or administrator settings.

7. The method of claim 1, wherein the requirement is determined based on ongoing statistics of the UI session processor.

8. The method of claim 7, wherein the statistics comprise at least one of queue lengths, frame update rates, aggregate encoded image quality information, power consumption information, or retransmission statistics.

9. The method of claim 1, wherein the first encoder is a software encoder and the offload encoder comprises hardware-optimized imaging functions not found in the first encoder.

10. The method of claim 1, further comprising:
    dynamically determining, when the second image portion is encoded by the offload encoder, a second requirement to encode a third image portion by the first encoder; and
    encoding the third image portion by the first encoder.

11. The method of claim 10, wherein the second requirement is determined based on at least one of a change in update rate of an image stream, reduced availability of at least one resource associated with the UI session processor, a need for a second virtual machine (VM) having a higher priority than a first VM comprising the first encoder to utilize the offload encoder, or receipt of a status parameter of the offload encoder.

12. The method of claim 1, wherein the requirement is determined by management software managing a plurality of virtual machines (VMs) at the host system, wherein a first VM of the plurality of VMs comprises the first encoder.

13. The method of claim 12, further comprising notifying, by the management software, the first VM of the requirement.

14. The method of claim 1, wherein the first image portion and the second image portion are rendered, encoded and communicated to a remote computer as part of a remote computing session with the remote computer.

15. The method of claim 1, wherein the first processor comprises at least one core of a Central Processing Unit (CPU) and a Graphics Processing Unit (GPU), the first processor executing instructions to render the first image portion, and the UI session processor comprises a hardware-optimized image encoder in the hardware optimized image encoding pipeline.

16. The method of claim 1, wherein the first image portion and the second image portion are display images from a software application of a Virtual Machine (VM).

17. The method of claim 1, wherein the first processor comprises a plurality of processing cores of a server.

18. An apparatus for image encoding, comprising:
    a first encoder, associated with a first processor at a host system, for encoding a first image portion;
    an offload encoder associated with a User Interface (UI) session processor at the host system, wherein the UI session processor comprises a hardware-optimized image encoding pipeline; and
    an application, associated with the first processor, for:
       dynamically determining a requirement to encode a second image portion by the first encoder or by the offload encoder, wherein the second image portion is subsequently encoded, based on the requirement, by the first encoder or the offload encoder; and
       transferring, when the offload encoder is used, compressed data representing the encoded second image portion from the UI session processor to the first processor, for network transmission,
       wherein the requirement indicates which of using the first encoder or the offload encoder for encoding the second image portion maximizes resource utilization of the host system.

19. The apparatus of claim 18, wherein the second image portion is encoded by the offload encoder to generate an encoded second image portion, and wherein the second encoded image portion is transmitted via the first processor to a remote system remotely located from the host system.

20. The apparatus of claim 18, wherein the requirement is determined based on usage of at least one resource associated with the UI session processor.

* * * * *